(12) United States Patent
Kawai

(10) Patent No.: US 6,292,269 B1
(45) Date of Patent: Sep. 18, 2001

(54) METHOD AND APPARATUS FOR IMAGE READING CAPABLE OF DETECTING DUST THAT DISTURBS IMAGE READING OPERATION

(75) Inventor: Yoshiaki Kawai, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/198,605

(22) Filed: Nov. 24, 1998

(30) Foreign Application Priority Data

Nov. 26, 1997 (JP) .................................................. 9-339517

(51) Int. Cl.$^7$ ...................................................... H04N 1/40
(52) U.S. Cl. ............................................. 358/1.9; 358/406
(58) Field of Search ........................... 358/1.9, 461, 406, 358/516, 504; 382/270, 273–274

(56) References Cited

U.S. PATENT DOCUMENTS

| | | | | |
|---|---|---|---|---|
| 5,644,409 | * | 7/1997 | Irie et al. ............................... | 358/461 |
| 5,982,948 | * | 11/1999 | Shimada et al. ...................... | 382/274 |
| 6,034,789 | * | 3/2000 | Kawai .................................. | 358/474 |

FOREIGN PATENT DOCUMENTS

| | | | |
|---|---|---|---|
| 05292317 | * | 11/1993 | (JP) . |
| 06070162 | * | 3/1994 | (JP) . |
| 06350848 | * | 12/1994 | (JP) . |
| 07327133 | * | 12/1995 | (JP) . |
| 11098329 | * | 4/1999 | (JP) . |
| 11164147 | * | 6/1999 | (JP) . |

* cited by examiner

*Primary Examiner*—Thomas D. Lee
*Assistant Examiner*—Stephen Brinich
(74) *Attorney, Agent, or Firm*—Oblon, Spivak, McClelland, Maier & Neustadt, P.C.

(57) ABSTRACT

An image reading apparatus which is capable of detecting a foreign particle interfering with an image reading operation includes a reference image plate, an image reading device, a peak value detector, a first memory, a comparator, and an error output controller. The reference image plate has a reference white image on the surface of the plate, and the first memory stores a first reference value. The image reading device reads such a reference white image for one line in a main scanning direction. The peak value detector detects a smallest data among the data which are included in the reference white image read by the image reading device. Then, the comparator compares the smallest data detected by the peak value detector with the first reference value. Finally, the error output controller outputs a white image error when the smallest data is smaller than the first reference value.

15 Claims, 20 Drawing Sheets

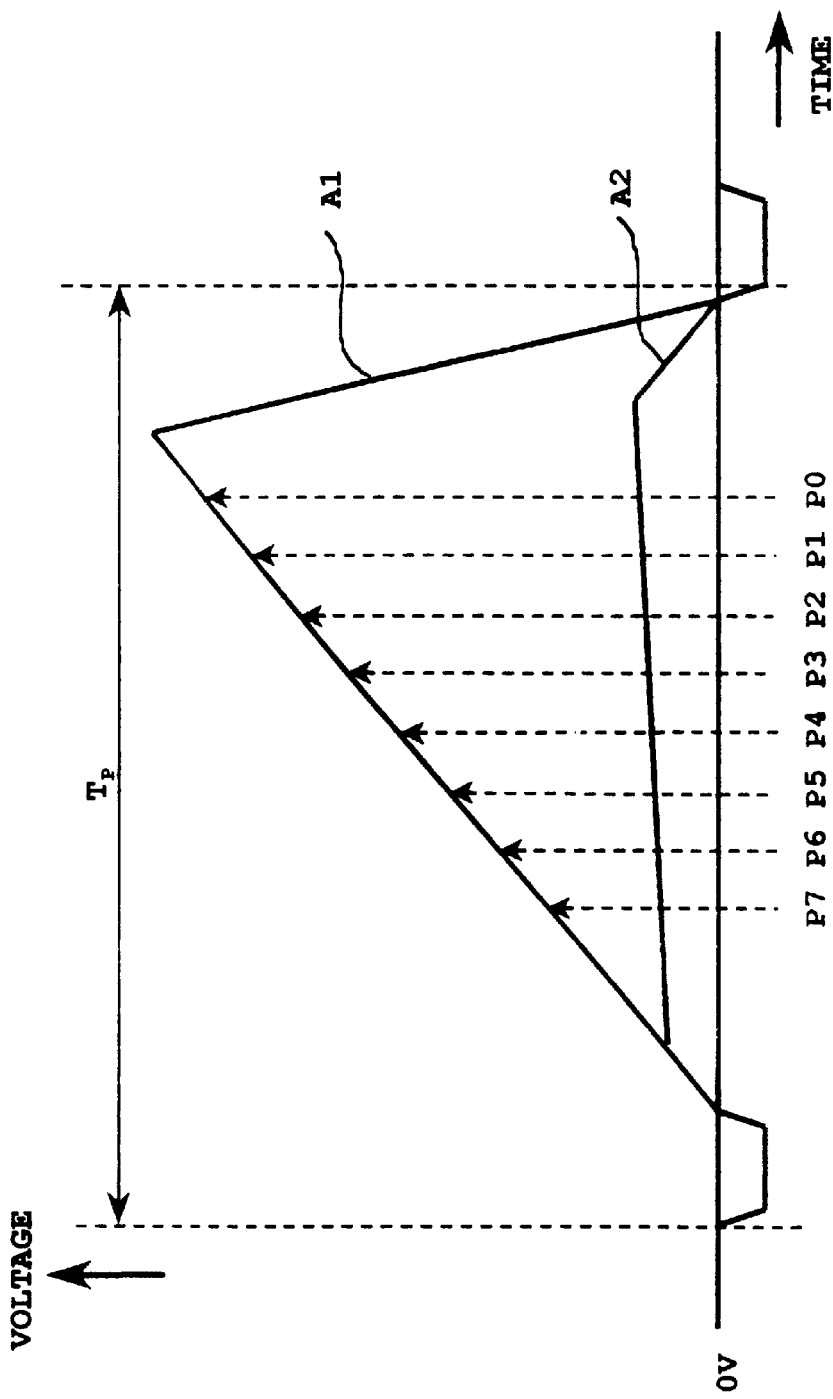

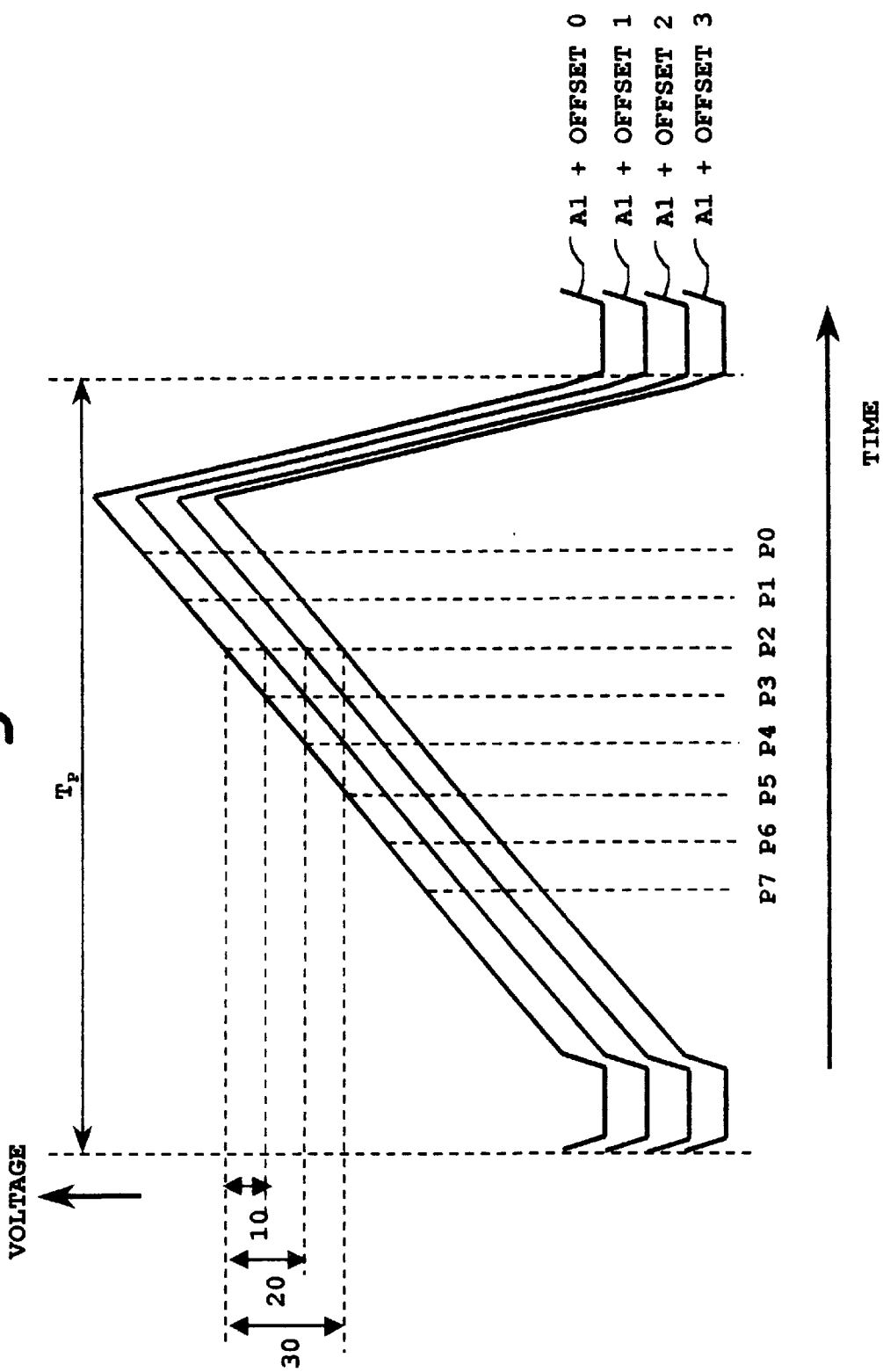

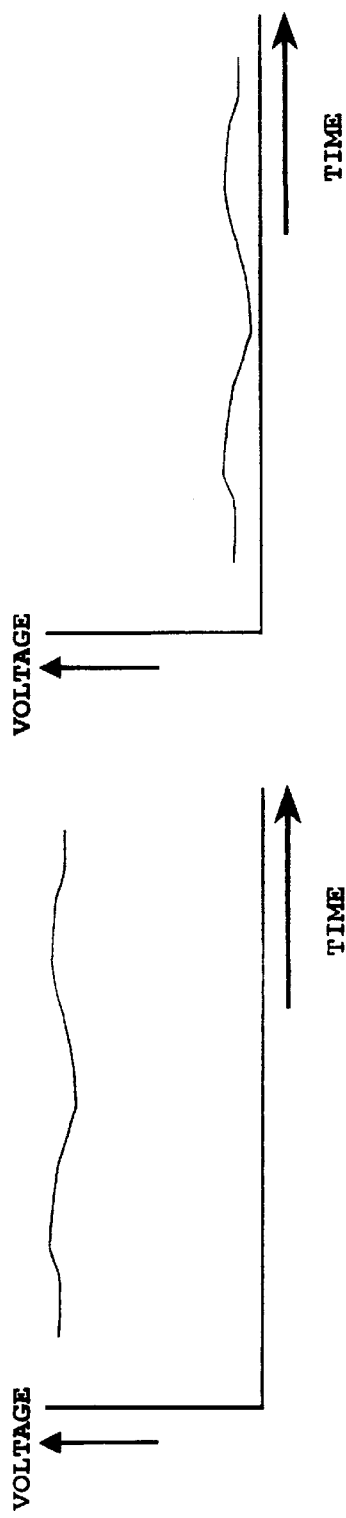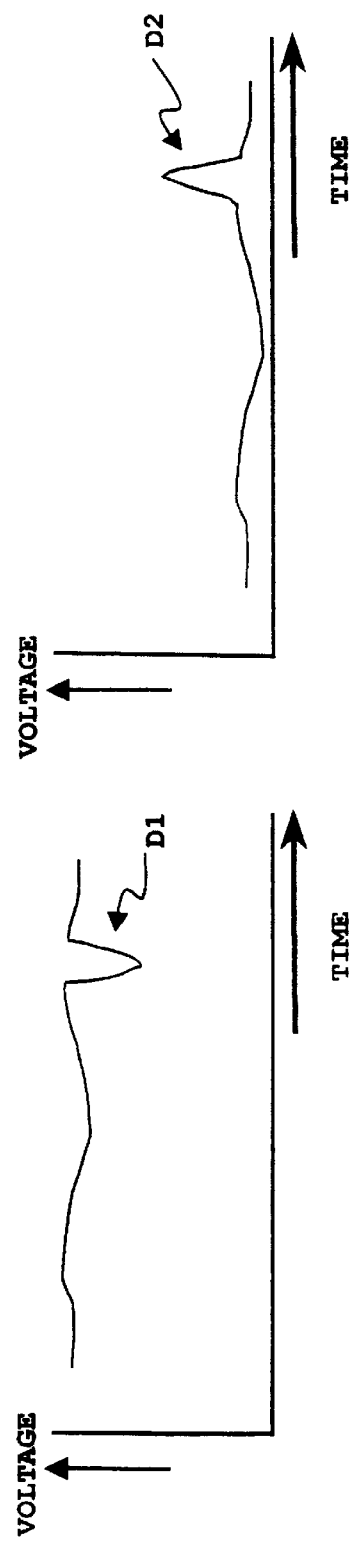

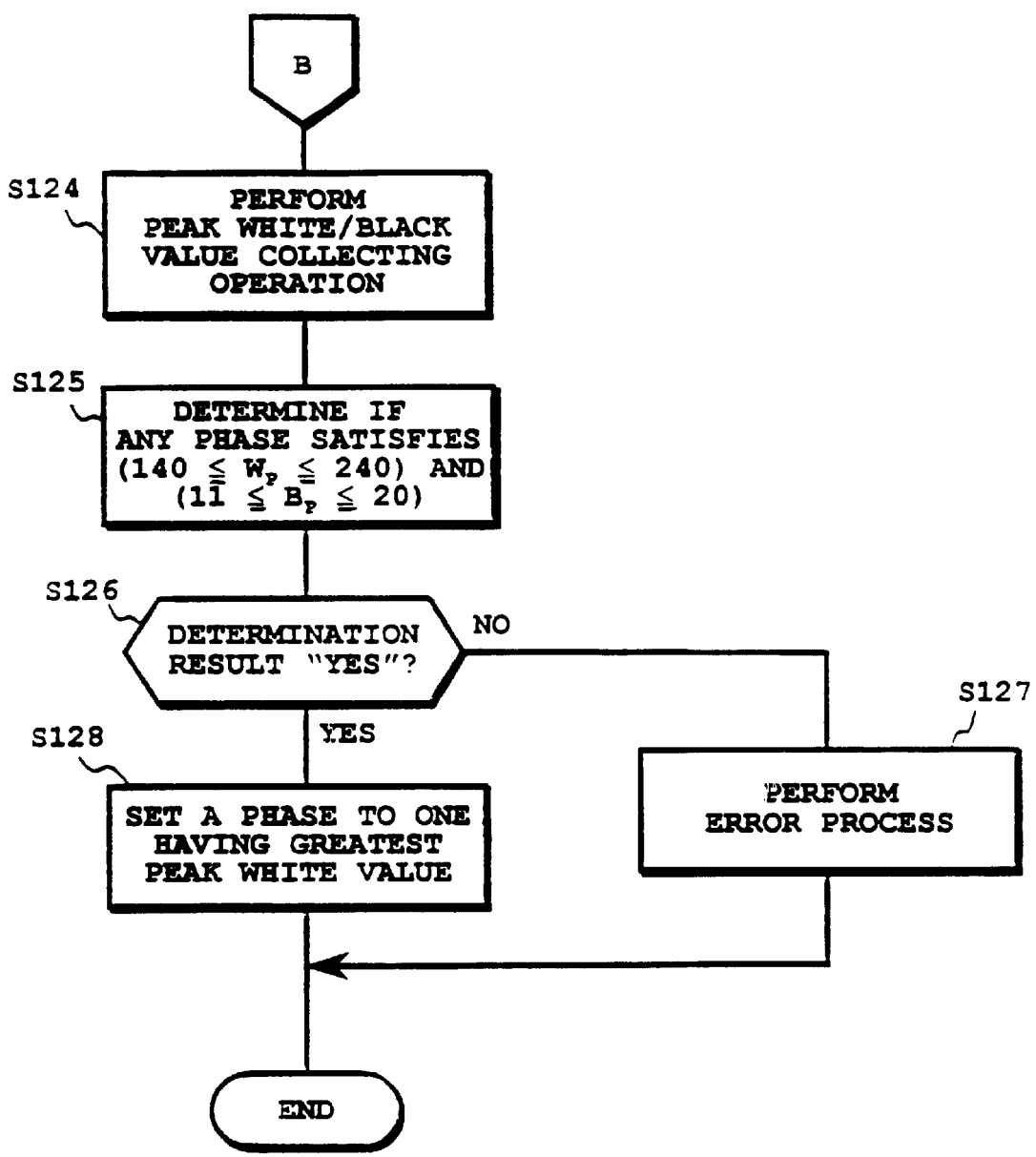

FIG. 8

| PHASE OF SAMPLE CLOCK SIGNALS - P(L) - | PEAK BLACK VALUE - $B_{P(L)}$ - | PEAK WHITE VALUE - $W_{P(L)}$ - |
|---|---|---|
| P0 | $B_{P(0)}$ | $W_{P(0)}$ |
| P1 | $B_{P(1)}$ | $W_{P(1)}$ |
| P2 | $B_{P(2)}$ | $W_{P(2)}$ |
| P3 | $B_{P(3)}$ | $W_{P(3)}$ |
| P4 | $B_{P(4)}$ | $W_{P(4)}$ |
| P5 | $B_{P(5)}$ | $W_{P(5)}$ |
| P6 | $B_{P(6)}$ | $W_{P(6)}$ |
| P7 | $B_{P(7)}$ | $W_{P(7)}$ |

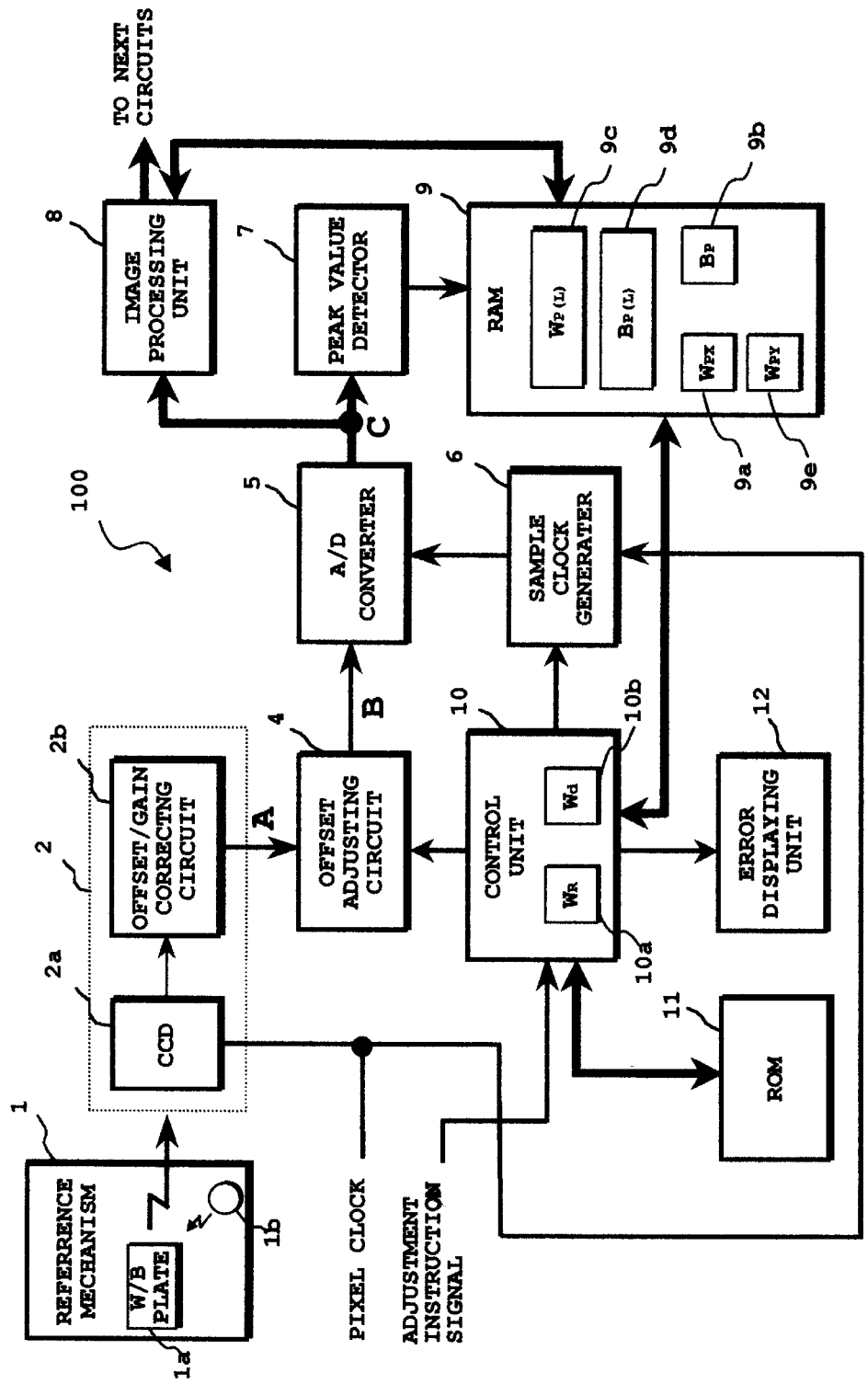

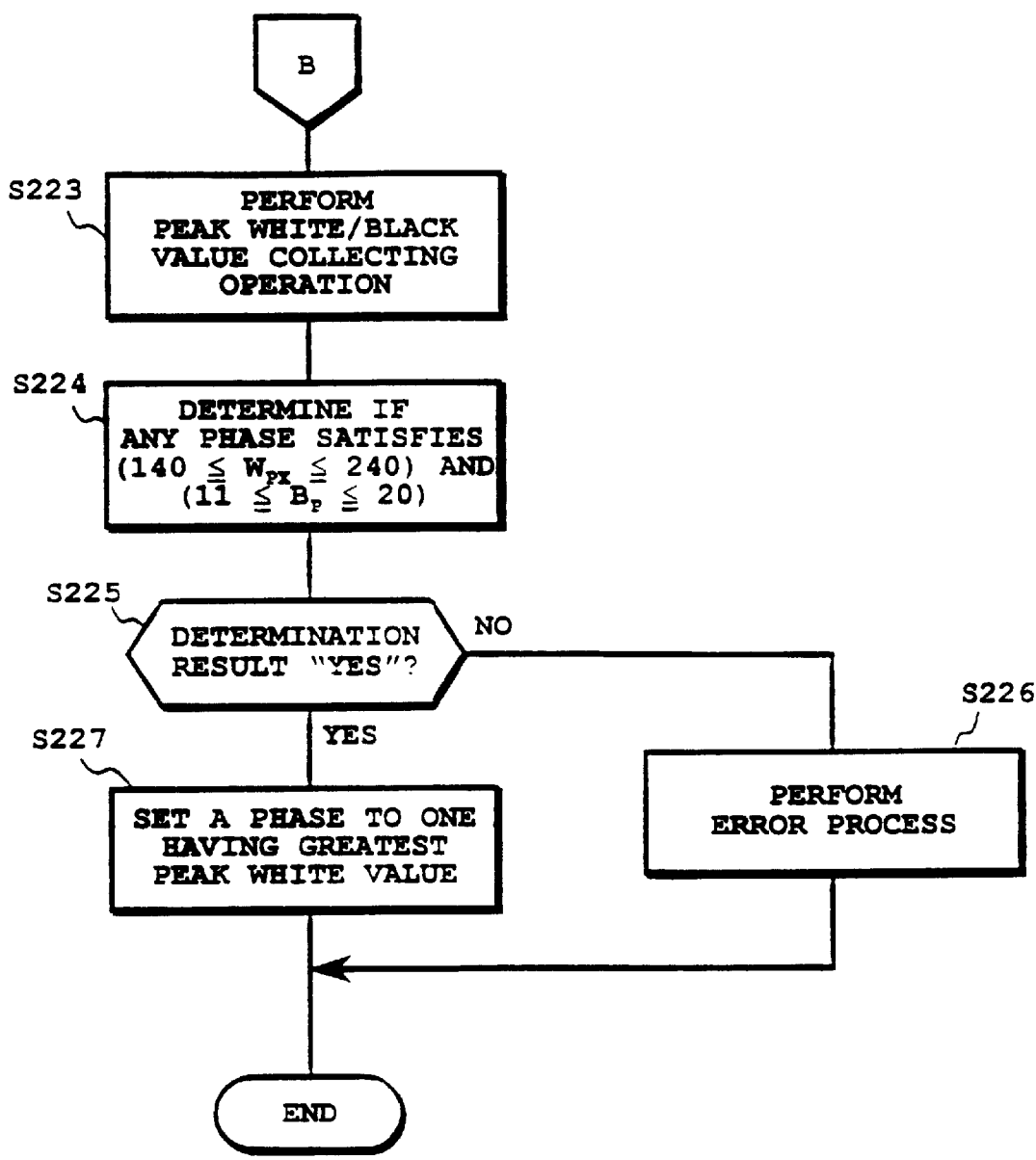

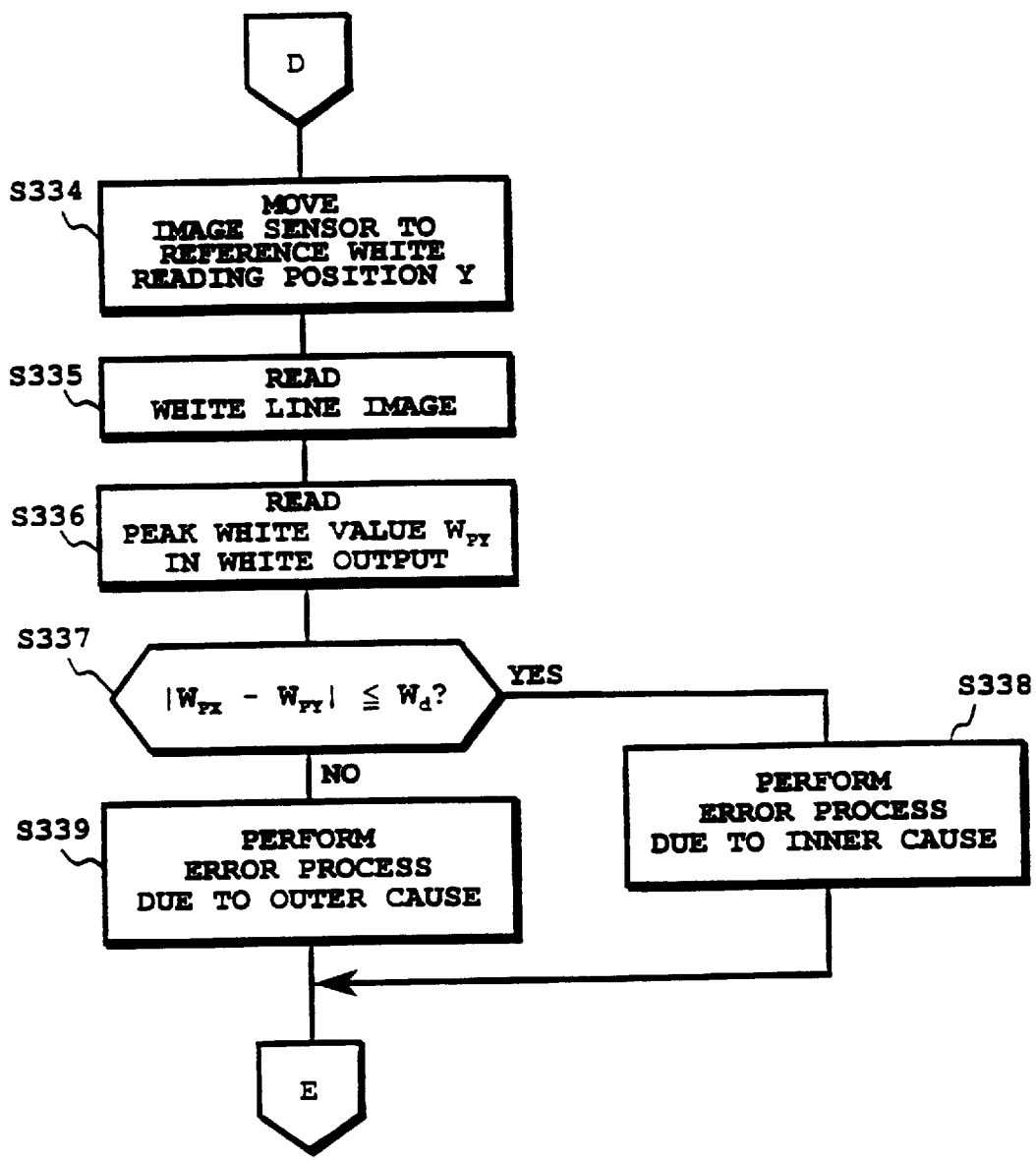

METHOD AND APPARATUS FOR IMAGE READING CAPABLE OF DETECTING DUST THAT DISTURBS IMAGE READING OPERATION

BACKGROUND OF THE INVENTION

1. Field of the Invention

The present invention relates to a method and apparatus for image reading, and more particularly to a method and apparatus for image reading that detects foreign particles which disturb an image reading operation.

2. Discussion of the Background

Many image reading apparatuses perform various operations for adjusting an image signal from an image sensor before starting the image reading operation. For such an adjusting operation, the image reading apparatus is generally provided with a reference white plate for an image sensor to read a reference white image. Based on the reference white image data for one main scanning length obtained by reading the reference white plate, the image reading apparatus adjusts gains of image signal in order to justify the level of the image signal from the image sensor, or performs a shading correction to correct for signal distortion due to inaccurate optical mechanisms employed therein or variations in optoelectronic conversion components such as a CCD (charge-coupled device), and so forth.

Also, the image reading apparatus is provided with a reference black plate for an image sensor to read a reference black image. Based on the reference black image data for one main scanning length obtained by reading the reference black plate, the image reading apparatus reduces an offset which is previously included in an image signal from the image sensor.

To perform the above-described adjustment and correction, the image reading apparatus is required to read the reference white and reference black plates in an accurate manner. However, even if the image reading apparatus reads the reference white and reference black plates, the reading accuracy may be disturbed by a foreign particle such as dust or the like which is put on the reference white and reference black plates.

More specifically, if a dust particle which is less white is put on the reference white image of the reference white plate, the level of the reference white image reading at the location of the foreign particle may erroneously be decreased. If a dust particle which is less black is put on the reference black image of the reference black plate, the level of the reference black image reading at the location of the foreign particle may erroneously be increased. The image reading apparatus will adjust the image signal based on such an erroneous reference white/black image data. When the image reading apparatus is connected to a printer, for example, the image data may be recorded on a recording sheet with an erroneous black line or the like.

Various solutions for the above-described problem have been introduced. For example, Japanese Patent Publication No. 60-251768(1985) describes a technique in which the image sensor reads a number of times reference white and reference black images in order to reduce an adverse influence to the reference white and reference black image signals by the foreign particle. However, this technique fails in speed, requiring a relatively long time period for completing the adjustment. In fact, causes of the erroneous image data may not be only the foreign particles put on the reference white/black image plate but also those on the interior of the image sensor. The former can be recovered by removing the foreign particles but the latter may need an exchange of the image sensor, for example.

Typically, these problems caused by the inner or outer foreign particles are found only after outputting the image data in a visual form such as a printout form. Yet, an abnormal print generally needs to be analyzed as to what the cause is. The foreign particle may be only one of the causes.

Therefore, at present, there is no image reading apparatus which is capable of detecting a foreign particle such as dust or the like which is put on a reference white/black plate or an image sensor, which disturbs an image reading operation.

SUMMARY OF THE INVENTION

Accordingly, an object of the present invention is to provide a novel image reading apparatus which is capable of detecting foreign particles such as dust or the like that may disturb an image reading operation, in an efficient manner and with a simple structure.

To achieve the above-mentioned object, one example of image reading apparatus according to the present invention includes a reference image plate, an image reading device, a peak value detector, a first memory, a calculator, and an error output controller. The reference image plate has a reference white image on the surface of the plate, and the first memory stores a first reference value. The image reading device reads such a reference white image for one line in a main scanning direction. The peak value detector detects the smallest data among the data which are included in the reference white image read by the image reading device. Then, the calculator compares the smallest data detected by the peak value detector with the first reference value. The error output controller outputs a white image error when the smallest data is smaller than the first reference value.

In one example, the image reading apparatus according to the present invention may includes a second memory for storing a second reference value. By including the second memory to store a second reference value, the image reading apparatus according to the present invention may perform the additional operations. For example, the image reading device may read the reference white image for one line in the main scanning direction at first and second positions which are different from each other. The peak value detector then detects the smallest data among the data which are included in the reference white image read at the first and second positions by the image reading device. Then, the calculator compares each of the smallest data read at the first and second positions with the first reference value, and calculates a difference between the smallest data read at the first and second positions with the second reference value. Finally, the error output controller outputs a white image error caused by an exterior error factor when at least one of the smallest data read at the first and second positions is smaller than the first reference value and when the difference between the smallest data is greater than the second reference value, and outputs a white image error caused by an interior error factor when at least one of the smallest data read at the first and second positions is smaller than the first reference value and when the difference between the smallest data is smaller than the second reference value.

In one example, the image reading apparatus according to the present invention may include a third memory for storing a third reference value. By including the third memory, the image reading apparatus may perform the additional operations. For example, the reference image plate has a reference black image on the surface of the plate. The image reading device reads the reference black image for one line in a main scanning direction in a first condition in which a light source illuminates the reference image plate and in a second condition in which no light source illuminates the reference image plate. The peak value detector detects the greatest data among the data included in the reference black image read in the first and second conditions, respectively, by the image reading device. Then, the calculator compares the greatest data read in the first condition with the greatest data read in the second condition, and calculates a difference between the greatest data read in the first and second conditions with the third reference value. Finally, the error output controller outputs a black image error when the difference is greater than the third reference value.

In one example of the image reading apparatus according to the present invention, the first memory may include a plurality of first reference values which are user selectable.

In another example of the image reading apparatus according to the present invention, the image reading device may be configured with a charge-coupled device.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 is a diagram illustrating exemplary white and black output waveforms of an image signal generated by an image sensor of the image reading apparatus of FIG. 1;

FIG. 3 is a diagram illustrating four exemplary white output waveforms of the image signal with four different offset levels;

FIGS. 4(A) and 4(B) illustrate typical waveforms of the image signals for white and black outputs which is read for one line in the main scanning direction by the image sensor of FIG. 1;

FIGS. 5(A) and 5(B) illustrate exemplary waveforms made particularly when foreign particles such as dust or the like are put on a image reading surface of the image sensor or other places so as to disturb an image reading operation of the image reading apparatus of FIG. 1;

FIGS. 6A–6C show flowcharts which illustrate a procedure of an offset/gain adjusting operation of the image reading apparatus of FIG. 1;

FIG. 8 is a table which includes a plurality of peak black and peak white values both corresponding to each of eight phases for sample clock signals and which is stored in a memory of the image reading apparatus of FIG. 1;

FIG. 9 is a schematic block diagram of another image reading apparatus according to a second preferred embodiment of the present invention;

FIGS. 10A–10D show flowcharts which illustrate a procedure of an offset/gain adjusting operation of the image reading apparatus of FIG. 9;

FIGS. 12A–12D show flowcharts which illustrate a procedure of an offset/gain adjusting operation of the image reading apparatus of FIG. 11;

DESCRIPTION OF THE PREFERRED EMBODIMENTS

Figure 1:
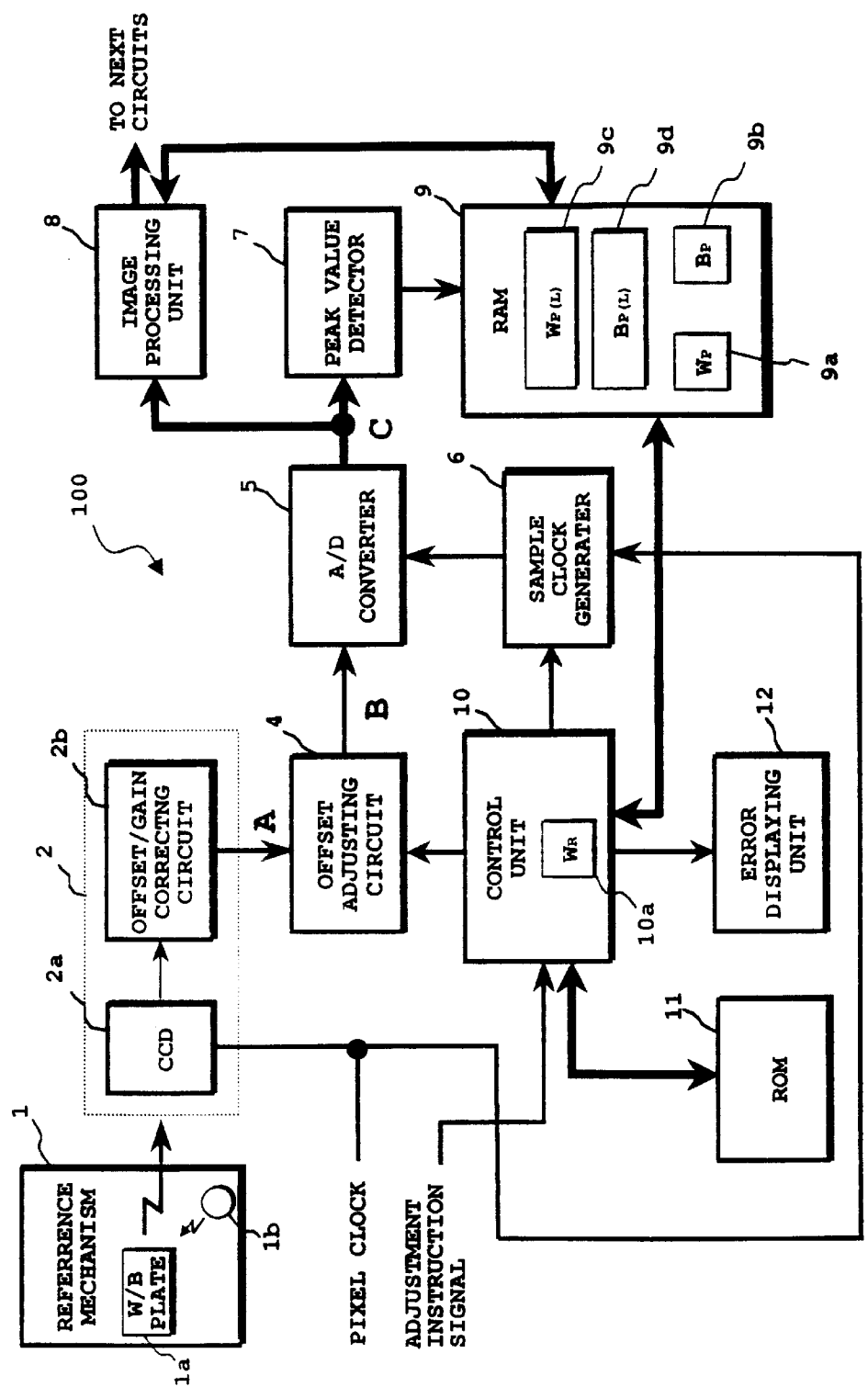
FIG. 1 is a schematic block diagram of an image reading apparatus according to a first preferred embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a block diagram for showing an overall configuration of an image reading apparatus 100 as a first embodiment according to the present invention.

The image reading apparatus 100 of FIG. 1 includes a white and black referencing mechanism 1 (referred to as a reference mechanism 1) which includes a reference white/black plate 1a, a light source 1b, and an image sensor 2 which includes a photoelectric conversion device such as a CCD (charge-coupled device) 2a. The image reading apparatus 100 further includes an offset/gain correction circuit 2b, an offset adjusting circuit 4, an A/D (analog-to-digital) converter 5, a sample clock generator 6, and a peak value detector 7. The image reading apparatus 100 further includes an image processing unit 8, a RAM (random access memory) 9, a control unit 10, a ROM (read only memory) 11, and an error display unit 12. The RAM 9 includes a first peak white value memory block 9a and a first peak black value memory block 9b. The RAM 9 further includes a second peak white value memory block 9c and a second peak black value memory block 9d. Since the former memory group of the first memory blocks 9a and 9b and the latter memory group of the second memory blocks 9c and 9d are not used at the same time, it may be possible to combine the both memory groups combined into one. The control unit 10 includes a reference white value register 10a. The reference white value register 10a may alternatively be located in the RAM 9.

The reference mechanism 1 is configured to provide white and black color references to an image data processing mechanism of the image reading apparatus 100. The reference white/black plate 1a has a surface having reference white and reference black line images thereon both in full length along a CCD scanning passage in the main scanning direction. The light source 1b may be a xenon lamp or the like, and illuminates the reference white/black plate 1a so as to intensify the reference white and black line images. The light source may be combined with another light source (not shown) that illuminates a document to be read by the image sensor 2. Such a reference white/black plate 1a needs to be maintained free from dust or the like. For this purpose, users are required to clean the reference white/black plate 1a occasionally.

The image reading apparatus 100 is provided with a clock generator (not shown) to generate clock signals, which are referred to as pixel clocks, for synchronizing image pixels. When reading a document, the CCD 2a of the image sensor 2 which receives the pixel clocks scans the document line by line in synchronism with the pixel clocks. The CCD 2a accordingly outputs a primary image signal which represents an image of the document. The primary image signal output from the CCD 2a is applied to the offset/gain correction circuit 2b. The offset/gain correction circuit 2b corrects for the gain and offset of the primary image output signal to the respectively appropriate levels. This correction makes an output signal from the image sensor 2 appropriate. The signal output from the image sensor 2 is referred to as an image signal A (indicated by the letter A), and is applied to the offset adjusting circuit 4.

When the image sensor 2 is installed, the offset/gain correction circuit 2b is adjusted to output an appropriate image signal. In addition, dust and the like on the image reading surface of the CCD 2a needs to be cleaned off.

The offset adjusting circuit 4 receives the image signal A from the image sensor 2 and an offset-level-change signal issued by the control unit 10. The offset adjusting circuit 4 generates an offset-counterbalancing signal (referred to as offset c/b signal) in response to the offset-level-change signal, and adds the offset c/b signal to the image signal A. After adding signals, the offset adjusting circuit 4 outputs a mixed signal of the image signal A and the offset-level-change signal. This output of the offset adjusting circuit 4 is referred to as an image signal B (indicated by the letter B). The image signal B is input to the A/D converter 5.

The A/D converter 5 which receives sample clock signals generated by the sample clock generator 6 performs an analog-to-digital data conversion in which the image signal B is sampled with the sample clock signals so that the analog information of the image signal is quantified as digital information. The A/D converter 5 outputs the thus-sampled signal, which is referred to as an image signal C (indicated by the letter C).

More specifically to the aforementioned quantification operation on the image signal B, the image reading apparatus 100 is provided with a reference voltage generating source (not shown) for supplying a reference voltage, i.e. 2 volts, for example. With this voltage, the offset adjusting circuit 4 is configured to output the image signal B variable in a 0- to 2-volts range. The analog information of the 0- to 2-volts range is divided into 256 stepping levels with an 8-bit resolution, for example. Such an 8-bit resolution of the A/D converter 5 may be other resolutions such as a 6-bit, 10-bit, 12-bit, or more-bit resolution.

The sample clock generator 6 receives the pixel clocks from the clock generator (not shown) and produces the aforementioned sample clock signals in synchronism with the pixel clocks. The sample clock generator 6 supplies the sample clock signals to the A/D converter 5, as described above. The sample clock generator 6 also receives a phase change signal for changing phases P(L) for the sample clock signals from the control unit 10.

The peak value detector 7 analyzes the image signal C line by line so as to detect the pixels which have the greatest and smallest values among pixels contained in each line of the image in the main scanning direction. When the CCD 2a reads the reference white line image, the image sensor 2 outputs a signal referred to as a white output. The smallest value detected in the white output is specifically referred to as a peak white value $W_P$. When the CCD 2a reads the reference black line image, the image sensor 2 outputs a signal referred to as a black output. The greatest value detected in the black output is specifically referred to as a peak black value $B_P$. Alternatively, the image sensor 2 may generate a peak dark value $B_P$ by detecting the peak black value output by the CCD 2a as it reads the reference white line image while the reference image is not illuminated.

After the above-described detection operations, the peak value detector 7 stores the peak white and peak black values of each image line, which have been detected, into the RAM 9 at predetermined locations, explained later, so as to be later read by the control unit 10. Detection of the peak white and peak black values of each image line by the peak value detector 7 is performed using, for example, the following simple data comparisons. When a plurality of successive pixels that constitute an image line are input into the peak value detector 7, values of two adjacent pixels are compared and a greater or smaller value is held. The value held is then compared with a value of the next adjacent pixel. This comparison is repeated one after another, and the value that is last held is determined as the peak white or peak black value of the image line.

The image processing unit 8 receives the image signal C and performs image processing operations, such as a shading correction and so forth. After the image processing unit 8, the image signal is transmitted to another stage of image processing operations and may be treated differently depending upon a host apparatus to which the image reading apparatus 100 is connected. For example, in some host apparatus, the image signal may be treated as the print data to be recorded on a recording sheet, or the display data to be displayed on a monitoring display of a host computer, or the facsimile data to be transmitted to other terminals.

The control unit 10 is a microcomputer for controlling the entire operation of the image reading apparatus 100 in accordance with the control procedure stored in ROM 11, using RAM 9 as a working memory. The reference white value register 10a of the control unit 10 stores a reference white value $W_R$. A plurality of reference white value $W_R$ may be pre-stored in the reference white value register 10a for user selection.

The RAM 9 receives the peak white and peak black values $W_P$ and $B_P$ from the peak value detector 7, and exchanges information with the image processing unit 8 and the control unit 10. The first peak white value memory block 9a stores the peak white value $W_P$ and the first peak black value memory block 9b stores the peak black value $B_P$. The second peak white value memory block 9c stores a peak white value set $W_{P(L)}$ and the second peak black value memory block 9a stores a peak black value set $B_{P(L)}$. The error display unit 12 includes a plurality of indicators such as LEDs (light-emitting diode), for example, for indicating various errors in accordance with the instructions from the control unit 10.

The thick data lines shown in FIG. 1 indicate the image data with multiple bits.

Next, the details of reference white and reference black values are explained with reference to FIG. 2. When the image signal A is sampled for a time period of a pixel cycle $T_p$, two different waveforms may be detected depending upon the image signal A, as illustrated in FIG. 2. A waveform A1 of FIG. 2 is typically generated when the image signal A is a white output signal, and a waveform A2 is typically generated when the image signal A is a black output signal. The white output signal is produced when the image sensor 2 reads the reference white line image of the reference white/black plate 1a. The black output signal is produced when the image sensor 2 reads the reference black line image of the reference white/black plate 1a.

When the dark output signal is used in place of the black output signal, a waveform thereof may be similar to the waveform A2. As described above, the dark output signal is produced by the image sensor 2 when the CCD 2a reads the reference white line image of the reference white/black plate 1a with the light source 1b turned off.

FIG. 2 also indicates eight-step phases P(L), i.e. from P(0) through to P(7) generated by the sample clock generator 6. The eight-step phases determine the timing of the sample clock signals during each pixel cycle $T_p$. The timing of the sample clock signals can be set to one of these eight-step phases by the phase change signal output from the control unit 10. Various known techniques are available to perform this phase change operation. For example, a set of different-delay-time elements may be provided and selectively applied to the sample clock signals. For another example, a set of the equal-delay-time elements connected in series may be provided and the number of connected delay elements may changeably applied to the sample clock signals.

As shown in FIG. 2, the waveforms A1 and A2 at the phase P(0) and P(7) are of the greatest and smallest voltages, respectively.

Next, functions of the offset c/b signal generated in the offset adjusting circuit 4 is explained with reference to FIG. 3. The waveforms A1 and A2 of FIG. 2 can be adjusted to different voltage levels. FIG. 3 illustrates four differently-shifted waveforms A1, for example, for the pixel cycle $T_p$, although this voltage level shift is applied to both waveforms A1 and A2. Each of the four waveforms A1 of FIG. 3 is generated by adding the offset c/b signal to the waveform A1 of FIG. 2. As described above, the offset c/b signal is generated by the offset adjusting circuit 4 in response to the offset-level-change signal from the control unit 10 and varied in a range from "offset 0" through to "offset 3" in accordance with the offset-level-change signal from the control unit 10.

The shift of the waveforms A1 shown in FIG. 3 is performed in connection to the degree of influence to the image signal C output from the A/D converter 5. As described above, the image signal C is generated in a form of the 256-level gray scale by the A/D converter 5 which has the 8-bit resolution capability. In conjunction with this 256-level gray scale of the image signal C, the shifting degrees of the "offset 0" through to "offset 3" are defined in the following manner. When the offset c/b signal is set to "offset 0," the signal does not shift the waveform A1. When the offset c/b signal is set to "offset 1," the signal pulls the waveform A1 downward to such an extent that the A/D converter 5 outputs the image signal C with a reduction of 10 gray scale levels. When the offset c/b signal is set to the "offset 2," the signal pulls the white output signal A1 downward to such an extent that the A/D converter 5 outputs the image signal C with a reduction of 20 gray scale levels. When the offset c/b signal is set at the "offset 3," the signal pulls the white output signal A1 downward to such an extent that the A/D converter 5 outputs the image signal C with a reduction of 30 gray scale levels.

In the exemplary circuit being explained, the offset adjusting circuit 4 is configured to add the offset c/b signal, which is an analog signal, to the analog image signal A so as to output the image signal B which is also an analog signal. The image signal B changes in a range of 0 to 2 volts. The A/D converter 5 receives the image signal B and converts the image signal B into a 256-level gray scale. Accordingly, one-level of the 256-level gray scale corresponds to an approximate value of 8 mV. Further, 10-, 20-, and 30-levels of the 256-level gray scale correspond to approximate values of 80 mV, 160 mV, and 240 mV, respectively.

Thus, in accordance with the selections of "offset 0", "offset 1", "offset 2", or "offset 3", the offset adjusting circuit 4 adds the offset c/b signal, which has a value of 0, −80, −160, or −240 mV, to the image signal A.

As described above, the voltage levels of the offset c/b signal is changed in accordance with the offset-level-change signal from the control unit 10. This voltage level changing operation may easily be achieved by the circuits known per se. For example, the offset adjusting circuit 4 may be provided with an D/A (digital-to-analog) circuit (not shown) and an adding circuit (not shown). The offset c/b signal which is sent from the control unit 10 to the offset adjusting circuit 4 is input to the D/A converter, so that the digital offset c/b signal is converted into an analog signal which can be formed in a desired waveform in accordance with the digital offset c/b signal input.

The thus-generated analog signal is determined as the offset-level-change signal. The analog offset-level-change signal is then input to the adding circuit inside the offset adjusting circuit 4. At the same time, the image signal A which is sent from the image sensor 2 to the offset adjusting circuit 4 is also input to the adding circuit, so that the adding circuit adds the analog offset offset-level-change signal to the image signal A. In this way, the control unit 10 controls the voltage level shift operation of the image signal A so as to output the image signal B in the different voltage level shifts.

In the above-described image reading apparatus 100, when the image sensor 2 reads the reference white line image of the reference white/black plate 1a, a value range from 140 to 240 is an appropriate range of the peak white value $W_P$ which is the smallest value detected in the white output included in the image signal C. When the image sensor 2 reads the reference black line image of the reference white/black plate 1a, a value range from 11 to 20 is an appropriate range of the peak black value $B_P$ in the black output included in the image signal C. Also, when the image sensor 2 reads the reference white line image of the reference white/black plate 1a with the light source 1b off, a value range from 11 to 20 is an appropriate range of the peak dark value $B_p$ in the dark output included in the image signal C.

FIGS. 4A and 4B illustrate the waveforms of the white and black output signals, respectively, for one image line when the reference white/black plate 1a and the image sensor 2 are in good conditions. More specifically, FIGS. 4A and 4B correspond to when the reference white/black plate 1a and the image sensor 2 has the CCD 2a of which image reading surface are clean, and the offset/gain correction circuit 2b is pre-adjusted to output an appropriate image signal. However, these waveforms will be distorted in a abnormal shape if the reference white/black plate 1a or the CCD 2a of the image sensor 2 is not clean, e.g. if a dust particle has adhered to, for example, a specific position relative to the image reading operation.

FIGS. 5A and 5B illustrate the waveforms of the white and black output signals, respectively, in a abnormal shape for one image line, which are formed when the reference white/black plate 1a or the CCD 2a of the image sensor 2 carries a dust particle, for example, on a specific position relative to the image reading operation. As illustrated in FIG. 5A, when the reference white/black plate 1a or the CCD 2a carries a dust particle on a specific position relative to the image reading operation and when the CCD 2a reads the reference white line image of the reference white/black plate 1a for one image line, the white output signal output from the CCD 2a may have an abnormal drop of voltage around an area (indicated by the letters D1) corresponding to the specific position where the dust particle is located.

When the reference white/black plate 1a or the CCD 2a carries a dust particle and when the CCD 2a reads the reference black line image of the reference white/black plate 1a for one image line, the black output signal output from the CCD 2a may have an abnormal rise of voltage around an area (indicated by the letters D2) corresponding to the specific position where the dust particle is put, as illustrated in FIG. 5B. Also, when the reference white/black plate 1a or the CCD 2a carries a dust particle and when the CCD 2a reads the reference white line image of the reference white/black plate 1a with the light source 1b off for one image line, the dark output signal output from the CCD 2a may have an abnormal rise of voltage around an area (indicated by the letters D2) corresponding to the specific position where the dust particle is put, as illustrated in FIG. 5B.

When a waveform of the image signal output from the CCD 2a is so distorted in an abnormal shape as illustrated in FIGS. 5A and 5B, various important signal processing operations such as the offset/gain correction by the offset/gain correction circuit 2b, the shading operation by the image processing unit 8, and so forth may not be performed in an accurate manner. As a result, when the output image signal is used as the print data, an output image on a recording sheet may have an abnormal black line or white line which is not included in an original image. Therefore, such a dust particle which is put on a specific position of the reference white/black plate 1a or the CCD 2a relative to the image reading operation must be detected and removed before the image reading operation.

Next, an exemplary procedure of offset/gain adjusting operation of the image reading apparatus 100 is explained with reference to FIGS. 6A–6C. This offset/gain adjusting operation of the image reading apparatus 100 includes, at the beginning thereof, an operation for detecting a foreign particle of dust or the like located on a specific position of the reference white/black plate 1a or the CCD 2a relative to the image reading operation.

Figure 6A:
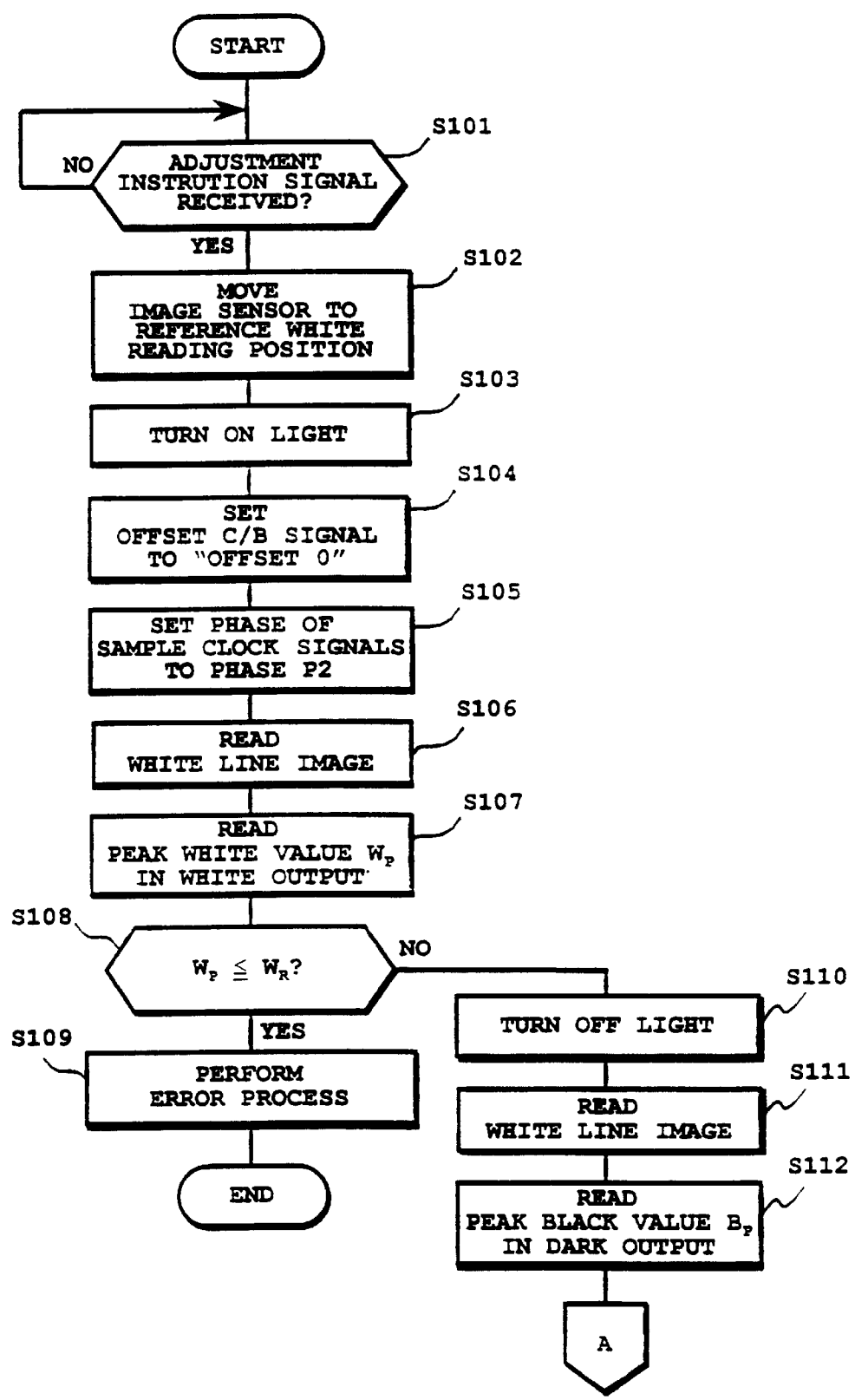

In FIG. 6A, through a NO loop formed in Step S101, the control unit 10 continuously watches for an input of an offset/gain adjustment instruction generated when an operator requests the offset/gain adjustment operation or when such is sent from a host apparatus (not shown) connected to the image reading apparatus 100.

When the control unit 10 detects an offset/gain adjustment instruction and Step S101 results in YES, the process proceeds to Step S102 in which the control unit 10 instructs a sub-scanning mechanism (not shown) to move the image sensor 2 to a reference white position at which the CCD 2a can read the reference white line image of the reference white/black plate 1a. Then, in Step S103, the control unit 10 instructs the light source 1b for irradiating the reference white/black plate 1a to turn the light on and to remain on when the light is on.

In Step S104, the control unit 10 temporarily selects and sends one of the offset-level-change signals to the offset adjusting circuit 4 so as to set the offset c/b signal to the "offset 0" level, or 0 mV. Accordingly, the image signal A, as it is, becomes the image signal B and is input to the A/D converter 5. In Step S105, the control unit 10 instructs the sample clock generator 6 to set the sample clock signal to the phase P(2), at which stable and average white and black outputs can be sampled.

Then, the control unit 10 instructs the image sensor 2 to read the reference white line image in the main scanning direction, in Step S106. At this time, the image signal A from the image sensor 2 is the white output and, accordingly, the image signal C corresponds to the white output. The peak value detector 7, also in Step S106, detects the peak white value $W_P$ from this white output and stores the detected peak white value $W_P$ in the first peak white value memory block 9a of the RAM 9. Then, in Step S107, the control unit 10 reads the peak white value $W_P$ from the RAM 9.

The control unit 10 then determines, in Step S108, if the peak white value $W_P$ is smaller than or equal to the reference white value $W_R$. The reference white value $W_R$ is such a value (i.e., 120) that no normal white output may have when the image sensor 2 performs the image reading operation with a clean reference white/black plate 1a and CCD 2a. If the peak white value $W_P$ is smaller than or equal to the reference white value $W_R$ and Step S108 results in YES, the process proceeds to Step S109. In this case, the control unit 10 determines that the reference white/black plate 1a the CCD 2a carries a foreign particle such as dust or the like. Accordingly, the control unit 10 performs an error process for an excessively-small white output, in Step S109. The control unit 10 then ends the process.

During the error process for the excessively-small white output, the control unit 10 instructs the error displaying unit 12 to display an error indication of the excessively-small white output. With this indication, the user will be notified of an action for cleaning the reference white/black plate 1a and the CCD 2a. Accordingly, when the operation is repeated from Step S101a after the cleaning, the Step S108 results in NO and the process proceeds to Step S110 which leads to the main portion of the offset/gain adjustment operation.

If the peak white value $W_P$ is not smaller than the reference white value $W_R$ and Step S108 results in NO, the process proceeds to Step S110. In this case, the control unit 10 determines that the reference white/black plate 1a and the CCD 2a carry no foreign particle such as dust or the like on the specific positions relative to the image reading operation. Then, the control unit 10 performs the image reading operation to read the reference white line image with the light source 1b off in order to generate a dark output, in Steps 110–112. More specifically, the control unit 10 controls the light source 1b to turn off in Step S110 and instructs the image sensor 2 to read the reference white line image in the main scanning direction in Step S111. At this time, the image signal A from the image sensor 2 is the dark output and, accordingly, the image signal C is the dark output. The peak value detector 7, also in Step S111, detects the peak black value $B_P$ from this dark output and stores the detected peak black value $B_P$ in the first peak black value memory block 9b of the RAM 9. Then, in Step S112, the control unit 10 reads the peak black value $B_P$ from the RAM 9.

Figure 6B:
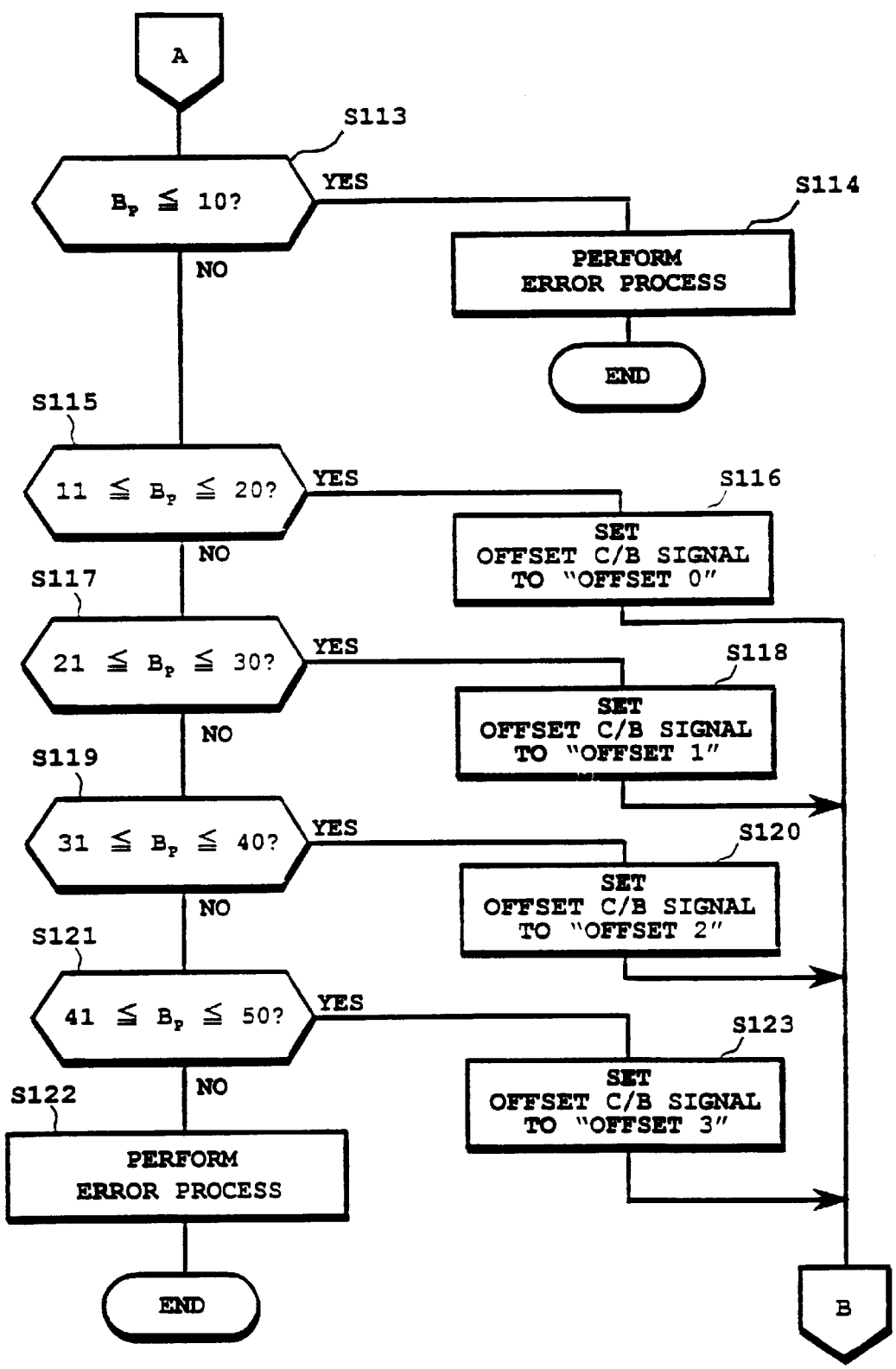

Then, in Step S113 of FIG. 6B, the control unit 10 determines whether the peak black value $B_P$ is equal to or smaller than 10. If the peak black value $B_P$ is equal to or smaller than 10 and Step S113 results in YES, the control unit 10 performs an error process for an excessively-small black output in Step S114. In the error process, the control unit 10 instructs the error displaying unit 12 to indicate an error. Then, the control unit 10 ends the process in an error state.

If the peak black value $B_P$ is greater than 10 and Step S113 results in NO, the process proceeds to Step S115 where the control unit 10 determines whether the peak black value $B_P$ is within the range including 11 through 20. If the peak black value $B_P$ is within that range and Step S115 results in YES, the process proceeds to Step S116 where the control unit 10 selects the offset-level-change signal so as to ultimately set the offset c/b signal to "offset 0", or 0 mV. That is, the image signal C is not reduced in gray scale. Then, the control unit 10 proceeds to Step S124 of FIG. 6C, explained later.

If the peak black value $B_P$ is greater than 20 and Step S115 results in NO, the process proceeds to Step S117 where the control unit 10 determines whether the peak black value $B_P$ is within the range including 21 through 30. If the peak black value $B_P$ is within that range and Step S117 is YES and the process proceeds to Step S118 in which the control unit 10 selects the offset-level-change signal so as to ultimately set the offset c/b signal to "offset 1", or 80 mV. That is, the image signal C is decreased 10 levels of gray scale. Then, the control unit 10 proceeds to Step S124 of FIG. 6C, explained later.

If the peak black value $B_P$ is greater than 30 and Step S117 results in NO, the process proceeds to Step S119 where the control unit 10 determines whether the peak black value $B_P$ is within the ranging including 31 through 40. If the peak black value $B_P$ is within that range and Step S119 is YES, the process proceeds to Step S120 in which the control unit 10 selects the offset-level-change signal so as to ultimately set the offset c/b signal to "offset 2", or 160 mV. That is, the image signal C is decreased 20 levels of gray scale. Then, the control unit 10 proceeds to Step S124 of FIG. 6C, explained later.

If the peak black value $B_P$ is greater than 40 and Step S119 results in NO, the process proceeds to Step S121 where the control unit 10 determines whether the peak black value $B_P$ is within the range including 41 through 50. If the peak black value $B_P$ is within that range and Step S121 is YES, the process proceeds to Step S123 in which the control unit 10 selects the offset-level-change signal so as to ultimately set the offset c/b signal to "offset 3", or 240 mV. That is, the image signal C is decreased 30 levels of gray scale. Then, the control unit 10 proceeds to Step S124 of FIG. 6C, explained later.

If the peak black value $B_P$ is greater than 50 and Step S121 results in NO, the control unit 10 performs an error process for an excessively-great black output in Step S122. In the error process, the control unit 10 instructs the error displaying unit 12 to indicate an error. Then, the control unit 10 ends the process in an error state.

After the offset c/b signal is to "offset 0" in Step S116, "offset 1" in Step S118, "offset 2" in Step S120, or "offset 3" in Step S123, the control unit 10 proceeds to Step S124. In Step S124, the control unit 10 performs a peak white/black value collecting operation for collecting the peak white and peak black values $W_P$ and $B_P$ for each of the phases P(0)–P(7) and storing these values into the second peak white memory block 9c and the second peak black value memory block 9d, respectively. Further details of the peak white/black value collecting operation will be explained later.

After the peak white/black value collecting operation in Step S124, the control unit 10 proceeds to Step S125. In Step S125, the control unit 10 analyzes the peak white and peak black values $W_{P(L)}$ and $B_{P(L)}$ stored in the second peak white memory block 9c and the second peak black value memory block 9d, respectively, so as to check if at least one of phases P(0)–P(7) represents the peak white values $W_P$ which is equal to or greater than 140 or equal to or smaller than 240 and the peak black value $B_P$ which is equal to or greater than 11 or equal to or smaller than 20. Then, in Step S126, the control unit 10 determines the check result of Step S125.

If Step S126 results in NO, the control unit 10 performs an error process for an abnormal peak white or black output. In the error process, the control unit 10 instructs the error displaying unit 12 to indicate an error. Then, the control unit 10 ends the process in an error state. In this case, at least one of the peak white and peak black values $W_P$ and $B_P$ is out of the predetermined appropriate range to such an extent that the inappropriate value cannot be corrected even by changes of the offset-level-change signal levels of the offset adjustment circuit 4 or the phases of the sample clock generator 6. Accordingly, the error indication by the error displaying unit 12 indicates to the user that the user needs to take appropriate actions such as exchanging the image sensor 2 with a new one.

If Step S126 results in YES, the control unit 10 proceeds the process to Step S128. In Step S128, the control unit 10 selects one phase which represents the greatest white value $W_P$ among all the peak white values $W_P$ represented by all the phases found in Step S125. Further, the control unit 10 instructs the sample clock generator 6 by the phase change signal to generate the sample clock signals in synchronism with the phase selected in Step S128.

In this way, the image reading apparatus 100 performs the offset/gain adjusting operation, and can detect a foreign particle such as dust or the like which disturb the image reading operation if the dust or the like is put on a specific position of the reference white/black plate 1a or the CCD 2a relative to the image reading operation.

Figure 7A:
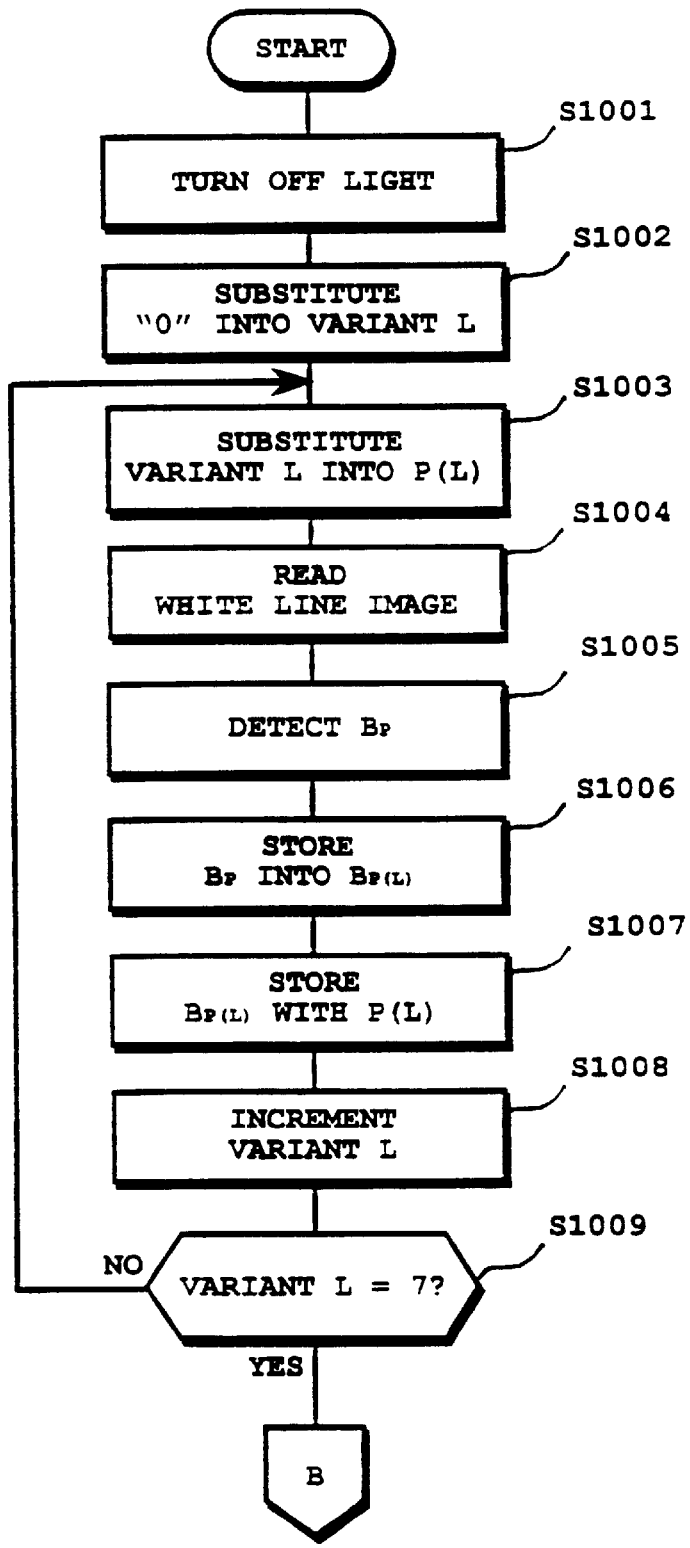
FIGS. 7A–7B show flowcharts which explain a procedure of a peak white/black value collecting operation of the image reading apparatus of FIG. 1.
Figure 7B:
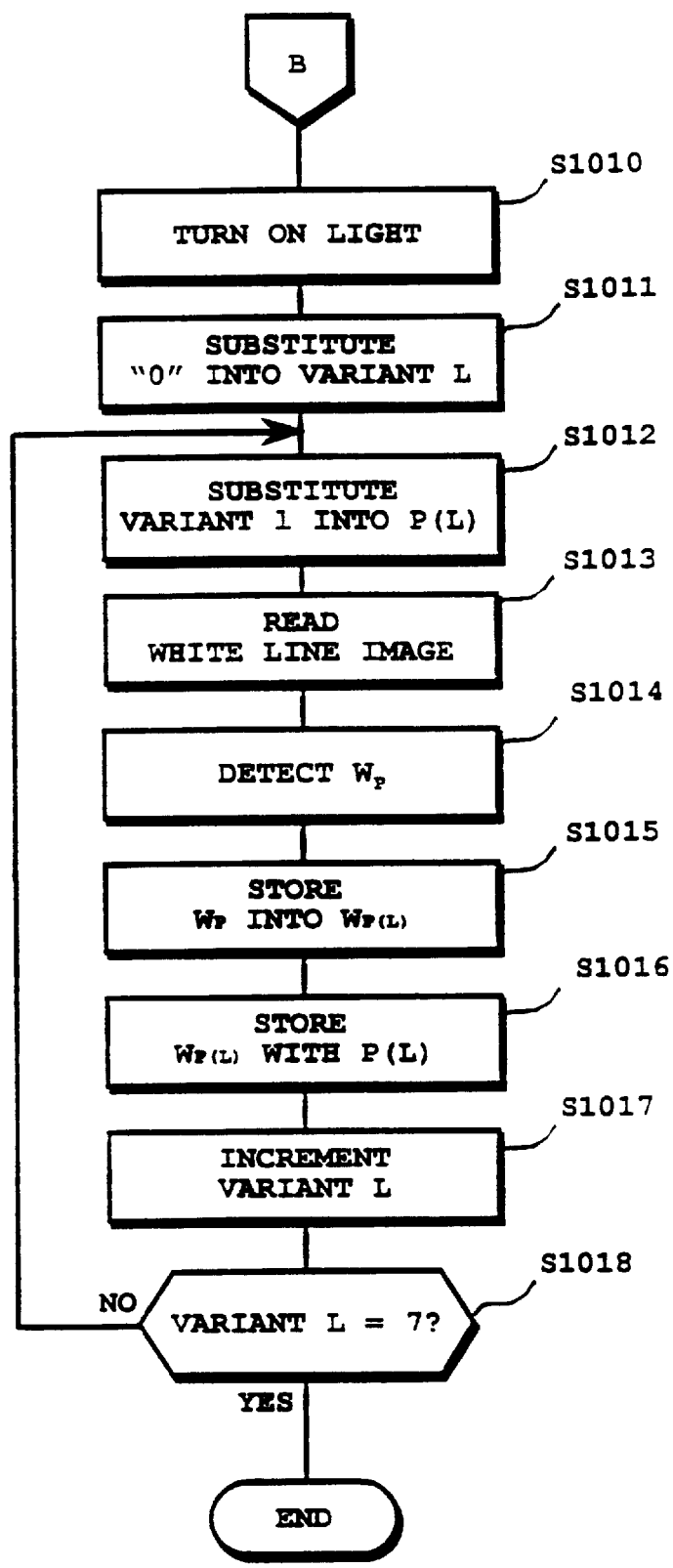

Next, details of the peak white/black value collecting operation in Step S124 of FIG. 6C is explained with reference to FIGS. 7A and 7B. In Step S1001 of FIG. 7A, the control unit 10 controls the light source 1b to turn off when the light is on and to remain off when the light is off. At this time, the control unit 10 controls the image sensor 2 to be located at the position for reading the reference white line image of the reference white/black plate 1a. Then, the control unit 10 sets a variant L for counting a number of performance times to 0 in Step S1002, and substitutes the variant L into the phase P(L) of the sample clock signals in Step S1003.

The control unit 10 instructs the image sensor 2 to read the reference white line image of the reference white/black plate 1a with the light source off, in Step S1004. Then, the control unit 10 instructs the peak value detector 7 to detect the peak black value $B_P$ in the dark output in Step S1005, and to store the detected value $B_P$ into the peak black value set $B_{P(L)}$ in Step S1006. Further, the control unit 10 stores the peak black value set $B_{P(L)}$ into the second peak black value memory block 9d with a link of $P_{(L)}$, in Step S1007. The control unit 10 then increments the variant L by one in Step S1008.

In the Step S1009, the control unit 10 determines if the value of the variant L equal to seven. If the value of the variant L is not equal to seven and Step S1009 results in NO, the process returns to Step S1003 to repeat the process of Step S1003–S1009 until the value of the variant L becomes equal to seven. When the value of the variant L becomes equal to seven and Step S1009 results in YES, the control unit 10 instructs the light source 1b to turn on in Step S1010 of FIG. 7B. By this time, the peak black value set $B_{P(L)}$ which includes $B_{P(0)}$ through to $B_{P(7)}$ corresponding to the phases P(L) which includes P(0) through to P(7) are collected and stored in the second peak black memory block 9d.

The control unit 10 sets the variant L to 0 in Step S1011, and substitutes the variant L into the phase P(L) in Step S1012. The control unit 10 instructs the image sensor 2 to read the reference white line image of the reference white/ black plate 1a with the light source on, in Step S1013. Then, the control unit 10 instructs the peak value detector 7 to detect the peak white value $W_P$ in the white output in Step S1014, and to store the detected value $W_P$ into the peak $BW_{P(L)}$ in Step S1015. Further, the control unit 10 stores the peak white value set $W_{P(L)}$ into the second peak white value memory block 9c with a link of $P_{(L)}$, in Step S1016. The control unit 10 then increments the variant L by one in Step S1017.

In the Step S1018, the control unit 10 determines if the value of the variant L equal to seven. If the value of the variant L is not equal to seven and Step S1018 results in NO, the process returns to Step S1012 to repeat the process of Step S1012–S1018 until the value of the variant L becomes equal to seven. When the value of the variant L becomes equal to seven and Step S1018 results in YES, the control unit 10 end the process. By this time, the peak white value set $W_{P(L)}$ which includes $W_{P(0)}$ through to $W_{P(7)}$ corresponding to the phases P(L) which includes P(0) through to P(7) are collected and stored in the second peak white memory block 9c, in addition to the peak black value set $B_{P(L)}$ stored in the second peak black memory block 9d. FIG. 8 illustrates these peak white and peak black value sets $W_{P(L)}$ and $B_{P(L)}$ which are collected into the second peak white memory block 9c and the second peak black memory block 9d, respectively, in the way described above.

Next, an image reading apparatus 200 as a second embodiment according to the present invention is explained with reference to FIGS. 9, 10A–10D. FIG. 9 illustrates a block diagram of an image reading apparatus 200 as a second embodiment according to the present invention. The image reading apparatus 200 of FIG. 9 is similar to the image reading apparatus 100 of FIG. 1, except for a third peak white value memory block 9e of the RAM 9 and a reference differential value register 10b of the control unit 10. The reference differential value register 10b may alternatively locate in the RAM 9. In the following description of the image reading apparatus 200, elements which correspond to those of the image reading apparatus 100 described with reference to FIG. 1 are provided with the same reference numerals, and the description for these elements are not repeated for the sake of conciseness.

In the image reading apparatus 200, the control unit 10 instructs the image sensor 2 to read, if necessary, twice at different positions the reference white line image of the reference white/black plate 1a during the offset/gain adjusting operation. The reference white value from the first read white output is referred to as a reference white value $W_{PX}$ and stored into the first reference white value memory block 9a. The reference white value from the second read white output is referred to as a reference white value $W_{PY}$ and stored into the third reference white value memory block 9e.

With reference to FIGS. 10A–10D, an exemplary procedure of the offset/gain adjusting operation of the image reading apparatus 200 is explained. This offset/gain adjusting operation of the image reading apparatus 200 includes, at the beginning thereof, an operation for detecting a foreign particle of dust or the like which is located on a specific position of the reference white/black plate 1a or the CCD 2a or an interior of the image sensor 2, relative to the image reading operation. Significantly, when a dust particle or the like is located inside the image sensor 2, the user cannot remove the foreign particle by cleaning.

Figure 10A:
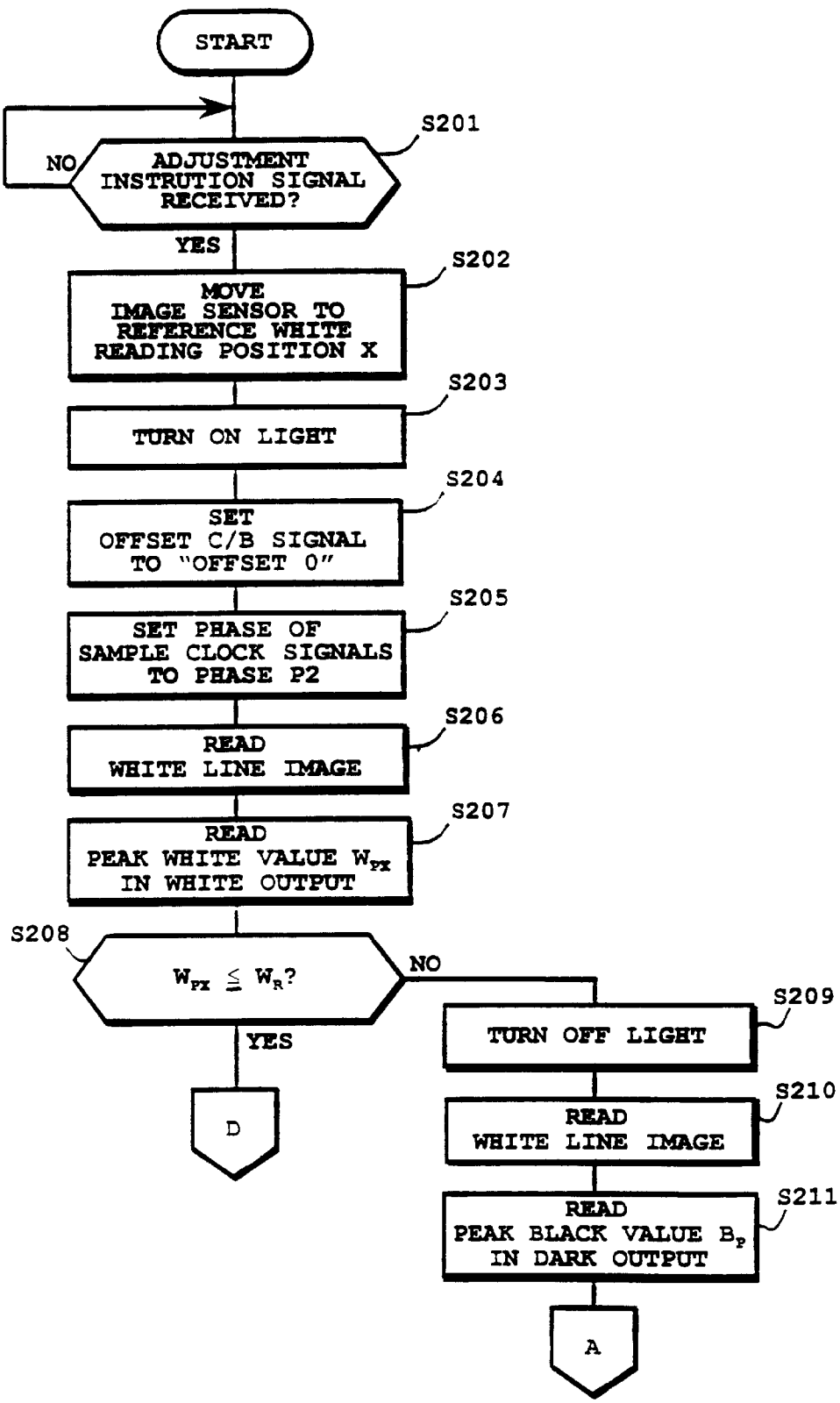

In FIG. 10A, through a NO loop which is formed in Step S201, the control unit 10 continuously watches for an input of an offset/gain adjustment instruction which is generated when an operator requests the offset/gain adjustment operation or when such is sent from a host apparatus (not shown) connected to the image reading apparatus 200.

When the control unit 10 detects the offset/gain adjustment instruction and Step S201 results in YES, the process proceeds to Step S202 in which the control unit 10 instructs a sub-scanning mechanism (not shown) to move the image sensor 2 to a first reference white reading position X at which the CCD 2a can read the reference white line image of the reference white/black plate 1a. Then, in Step S203, the control unit 10 instructs the light source 1b for irradiating the reference white/black plate 1a to turn on when the light is off and to remain on when the light is on.

In Step S204, the control unit 10 temporarily selects and sends one of the offset-level-change signals to the offset adjusting circuit 4 so as to set the offset c/b signal to the "offset 0" level, or 0 mV. Accordingly, the image signal A, as it is, becomes the image signal B and is input to the A/D converter 5. In Step S205, the control unit 10 instructs the sample clock generator 6 to set the sample clock signal to the phase P(2), at which stable and average white and black outputs can be sampled.

Then, the control unit 10 instructs the image sensor 2 to read the reference white line image at the first reference white reading position X in the main scanning direction, in Step S206. At this time, the image signal A from the image sensor 2 is the white output and, accordingly, the image signal C is the white output. The peak value detector 7, also in Step S206, detects the peak white value $_{WPX}$ from this white output and stores the detected peak white value $W_{PX}$ in the first peak white value memory block 9a of the RAM 9. Then, in Step S207, the control unit 10 reads the peak white value $W_{PX}$ from the RAM 9.

The control unit 10 then determines, in Step S208, if the peak white value $W_{PX}$ is smaller than the reference white value $W_R$. The reference white value $W_R$ is such a value that no normal white output may have when the image sensor 2 performs the image reading operation when the reference white/black plate 1a and the interior and the exterior of the image sensor 2 are clean.

If the peak white value $W_{PX}$ is not smaller than the reference white value $W_R$ and Step S208 results in NO, the process proceeds to Step S209. In this case, the control unit 10 determines that the reference white/black plate 1a and the interior and the exterior of the image sensor 2 carry no foreign particle such as dust or the like on the specific positions relative to the image reading operation. Then, the control unit 10 performs the image reading operation to read the reference white line image with the light source 1b off in order to generate a dark output, in Steps 209–211.

Figure 10B:
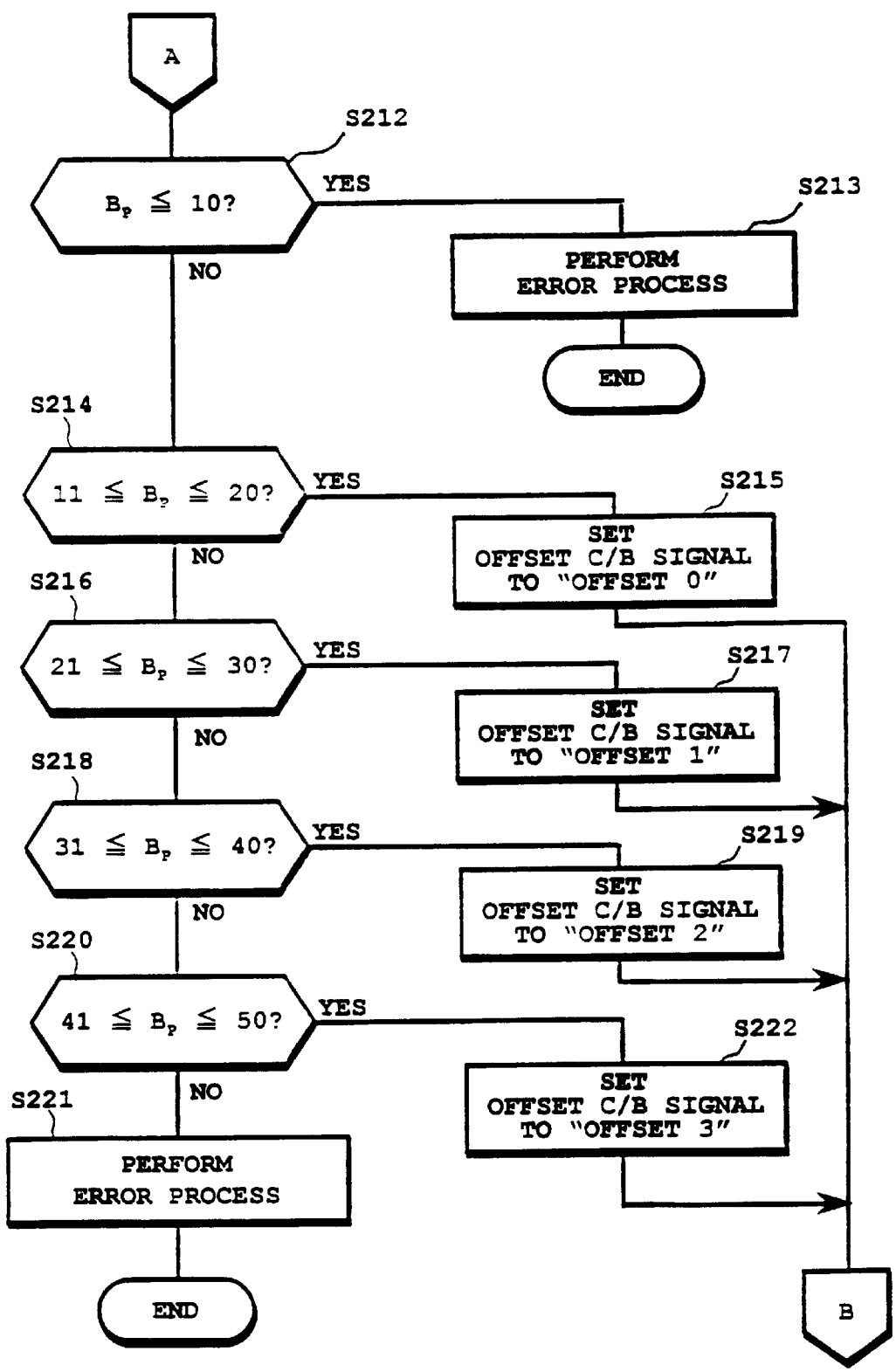

After the image reading operation in Steps S209–S211, the control unit 10 performs the main portion of the offset/gain adjusting operation in Step S212–S222 of FIG. 10B and Steps S223–S227 of FIG. 10C. Descriptions for these operation steps is omitted since they are similar to those of the image reading apparatus 100 explained in Steps S113–123 of FIG. 6B and Steps S124–S128 of FIG. 6C. Also, the peak white/black value collecting operation which is performed in Step S223 of FIG. 10C is similar to that of Step S124 of FIG. 6C.

Figure 10D:
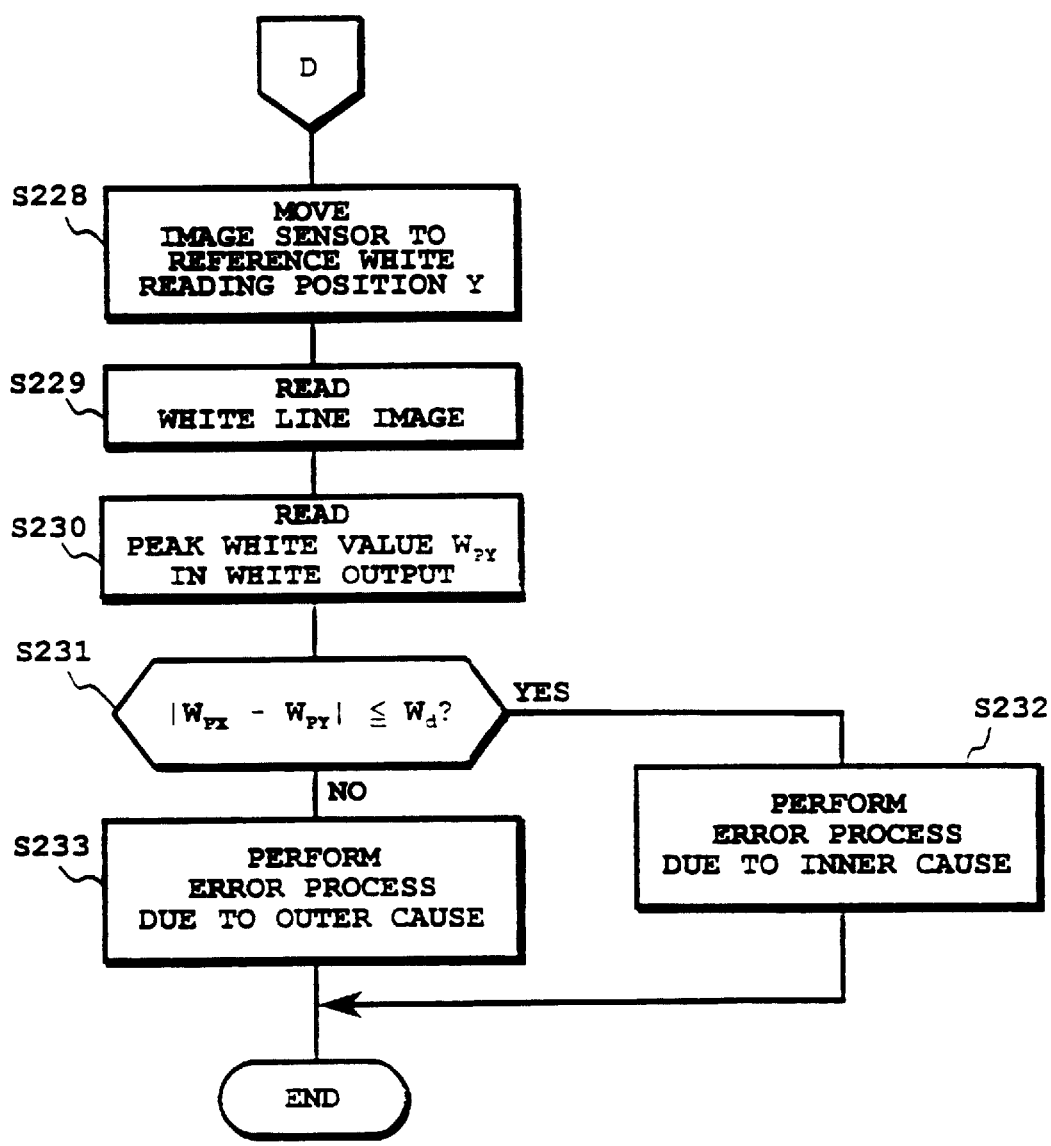

In Step S208 of FIG. 10A, if the peak white value $W_{PX}$ is smaller than the reference white value $W_R$ and the determination results in YES, the process proceeds to Step S228 of FIG. 10D. In this case, the control unit 10 determines that the reference white/black plate 1a or the interior or the exterior of the image sensor 2 carries a foreign particle such as dust or the like. Accordingly, the control unit 10 performs an error process for identifying whether an error is caused by a foreign particle such as dust or the like located on one of the reference white/black image plate 1a, the exterior of the image sensor 2, or on the interior of the image sensor 2.

In Step S228, the control unit 10 instructs the image sensor 2 to move to a second reference white reading position Y. Then, the control unit 10 further instructs the image sensor 2 to read the reference white line image at the second reference white reading position Y in the main scanning direction, in Step S229. At this time, the image signal A from the image sensor 2 is the white output and, accordingly, the image signal C is the white output. The peak value detector 7, also in Step S229, detects the peak white value $W_{PY}$ from this white output and stores the detected peak white value $W_{PY}$ in the third peak white value memory block 9e of the RAM 9. Then, in Step S230, the control unit 10 reads the peak white value $W_{PY}$ from the RAM 9.

The control unit 10 then determines, in Step S231, if the difference between the peak white values $W_{PX}$ and $W_{PY}$ is smaller than or equal to the reference differential value $W_d$. If the difference between the peak white values $W_{PX}$ and $W_{PY}$ is smaller than or equal to the reference differential value $W_d$ and Step S231 results in YES, the control unit 10 determines that the error which has occurred is caused by a foreign particle such as dust or the like which is put on the interior of the image sensor 2. Then, in Step S232, the control unit 10 performs an error process for an abnormal offset adjustment due to an internal cause.

During the error process in Step S232 for the abnormal offset adjustment due to an internal cause, the control unit 10 instructs the error displaying unit 12 to display an error of abnormal offset adjustment due to an internal cause. With this indication, the user will be instructed to exchange the image sensor 2 with a new one. Accordingly, when the operation is repeated from Step S201 after the exchange of the image sensor 2, the Step S208 may result in NO and the process proceeds to Step S209 which leads to the main portion of the offset/gain adjustment operation.

In Step S231, if the difference between the peak white values $W_{PX}$ and $W_{PY}$ is not smaller than or equal to the reference differential value $W_d$ and Step S231 results in NO, the control unit 10 determines that the error which has occurred is caused by a foreign particle such as dust or the like located on one of the reference white/black image plate 1a and the exterior of the image sensor 2. Then, the control unit 10 proceeds the process to Step S232 where the control unit 10 performs an error process for an abnormal offset adjustment due to an external cause.

During the error process in Step S233 for the abnormal offset adjustment due to an external cause, the control unit 10 instructs the error displaying unit 12 to display an error of the abnormal offset adjustment due to an external cause. With this indication, the user will be notified of an action for cleaning off the components relative to the image reading operation, such as the reference white/black image plate 1a, the image reading surface of the CCD 2a, and the like. Accordingly, when the operation is repeated from Step S201 after the cleaning, the Step S208 may result in NO and the process proceeds to Step S209 which leads to the main portion of the offset/gain adjustment operation.

In this way, the image reading apparatus 100 performs the offset/gain adjusting operation, and can detect a foreign particle such as dust or the like which disturb the image reading operation when such foreign particle is put on a specific position relative to the image reading operation, such as one of the reference white/black plate 1a and the exterior of the image sensor 2, or the interior of the image sensor 2, or the like.

Figure 11:
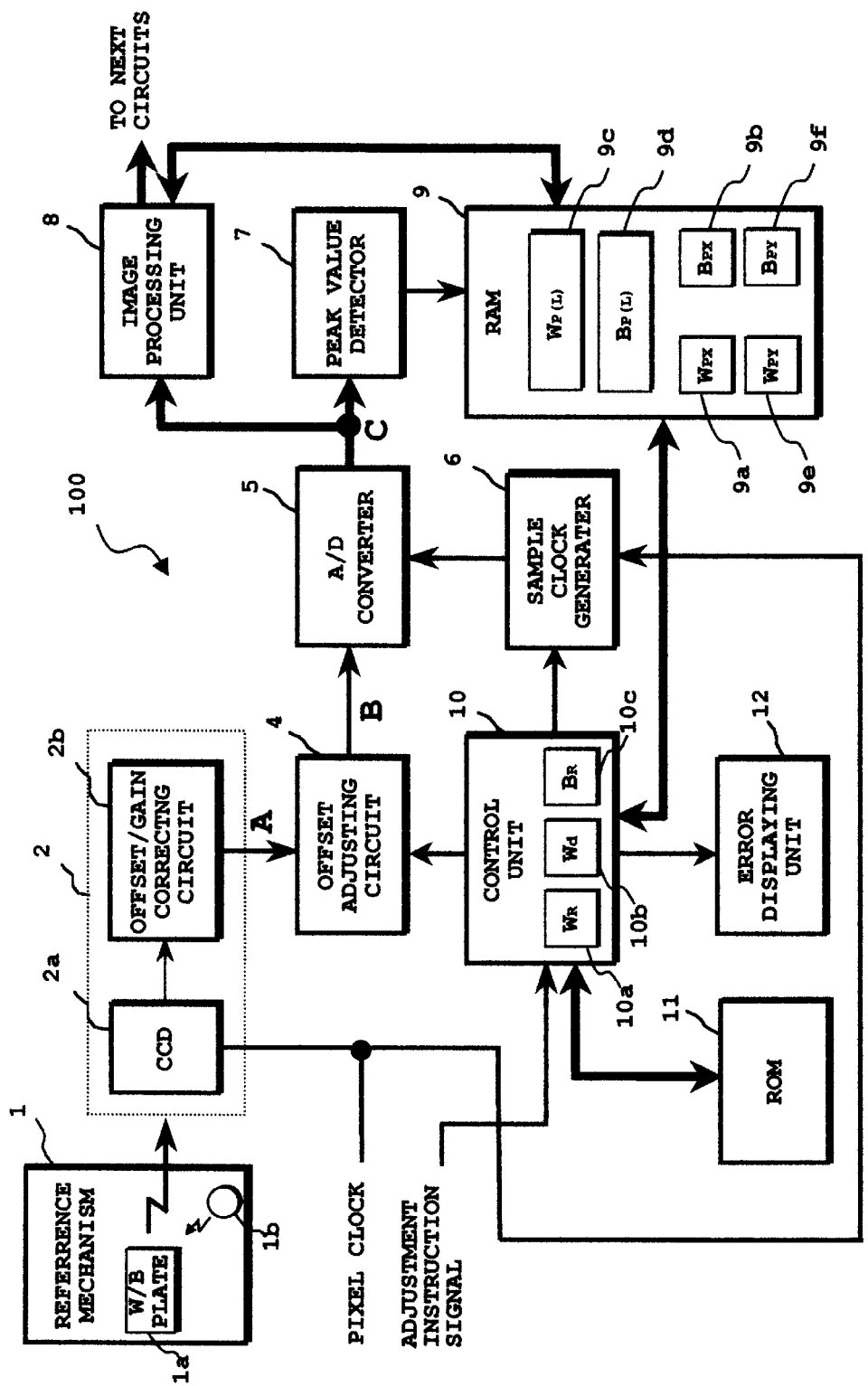
FIG. 11 is a schematic block diagram of still another image reading apparatus according to a third preferred embodiment according to the present invention.

Next, an image reading apparatus 300 as a third embodiment according to the present invention is explained with reference to FIGS. 11, 12A–12D. FIG. 11 illustrates a block diagram of an image reading apparatus 300 as a third embodiment according to the present invention. The image reading apparatus 300 of FIG. 11 is similar to the image reading apparatus 100 of FIG. 1, except for a third peak white value memory block 9e, a third peak black value memory block 9f, a reference differential value register 10b, and a reference black value register 10c. The former two memory blocks 9e and 9f are included in the RAM 9 and the latter two registers 10b and 10c are included in the control unit 10. The latter two registers 10b and 10c may alternatively be included in the RAM 9. In the following description of the image reading apparatus 300, elements which correspond to those of the image reading apparatus 100 described with reference to FIG. 1 are provided with the same reference numerals, and the description for these elements are not repeated for the sake of conciseness.

In the image reading apparatus 300, the control unit 10 instructs the image sensor 2 to read in different ways the reference white and reference black line images of the reference white/black plate 1a during the offset/gain adjusting operation. The reference white value from the first read white output at a reference white reading position X is referred to as a reference white value $W_{PX}$ and stored into the first reference white value memory block 9a. The reference black value from the first read black output is referred to as a reference black value $B_{PX}$ and stored into the first reference black value memory block 9b. The reference white value from the second read white output at another reference white reading position Y is referred to as a reference white value $W_{PY}$ and stored into the third reference white value memory block 9e. The reference black value from the second read dark output, reading the reference black line image with the light source 1b off, is referred to as a reference black value $B_{PY}$ and stored into the third reference black value memory block 9f.

As mentioned above, in the image reading apparatus 300, the control unit 10 instructs the image sensor 2 to read the reference black line image instead of the reference white line image with the light source 1b off, after reading the reference white line image, in order to increase the reading accuracy.

With reference to FIGS. 12A–12D, an exemplary procedure of the offset/gain adjusting operation of the image reading apparatus 300 is explained. This offset/gain adjusting operation of the image reading apparatus 300 includes, at the beginning thereof, an operation for detecting a foreign particle of dust or the like which is located on a specific position of the reference white line image or the reference black line image of the reference white/black plate 1a or the CCD 2a or an interior of the image sensor 2, relative to the image reading operation. Significantly, when a dust particle or the like is located inside the image sensor 2, the user cannot remove such foreign particle by cleaning.

Figure 12A:
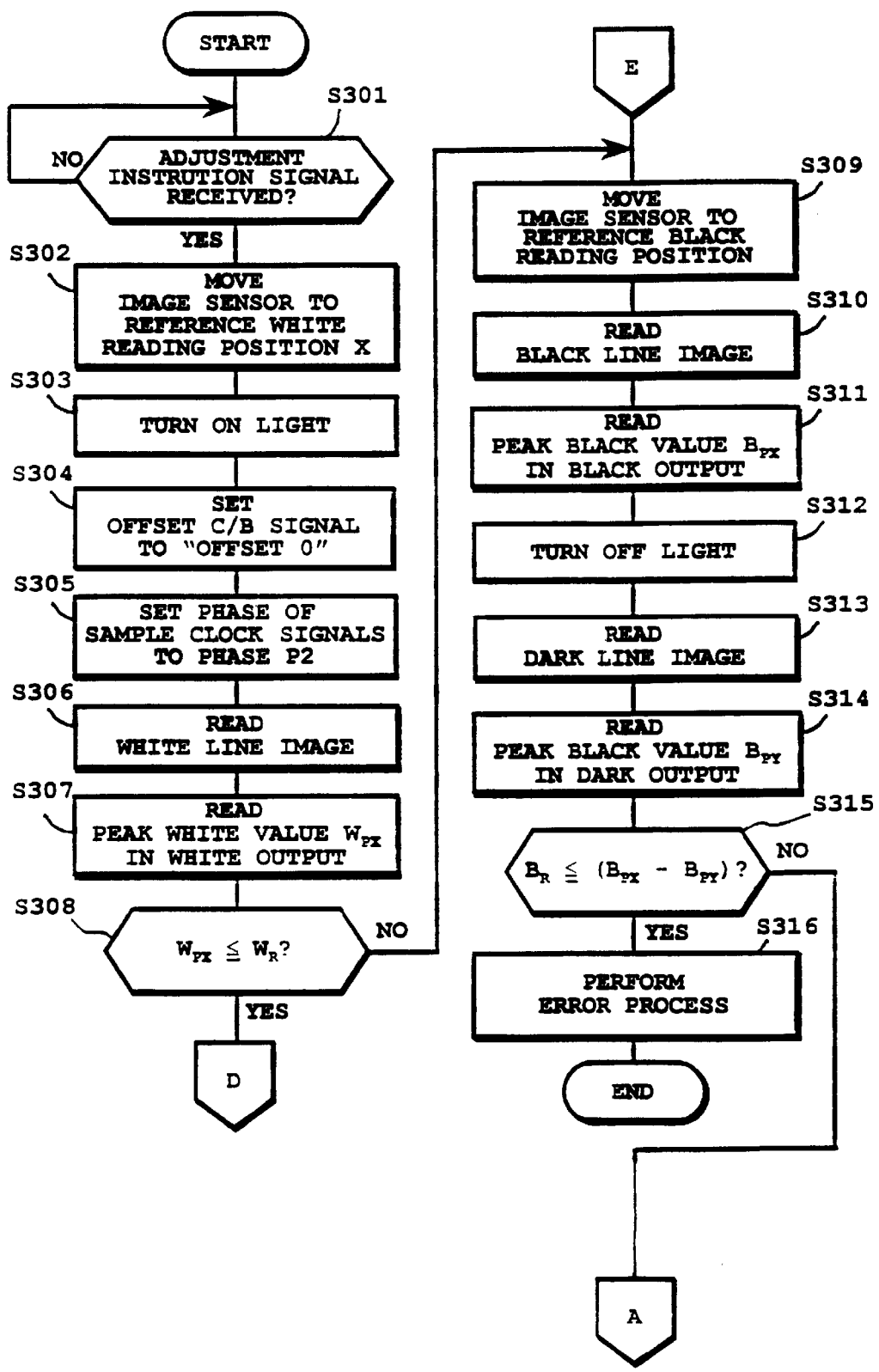
Figure 12B:
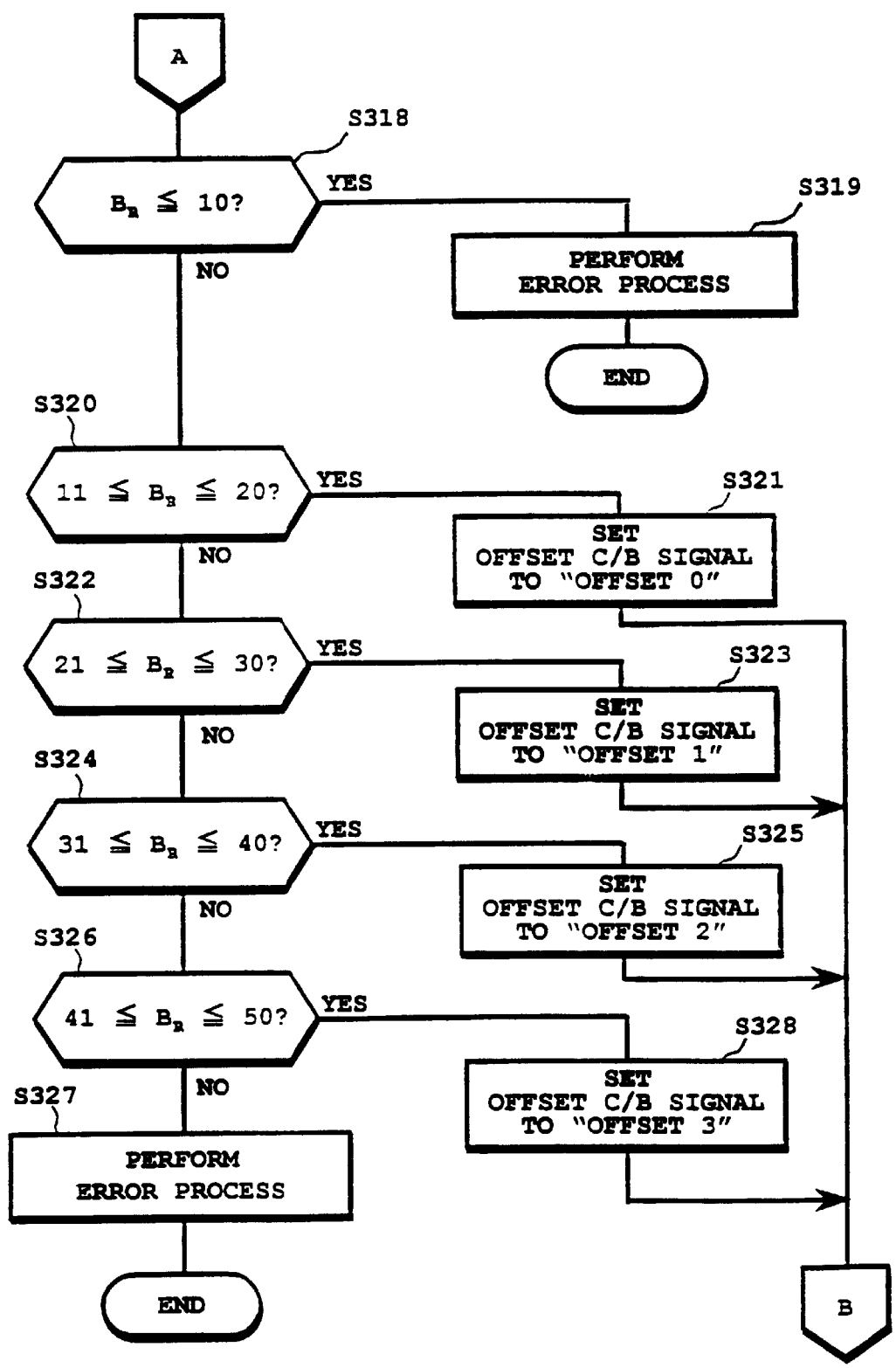

In FIG. 12A, through a NO loop which is formed in Step S301, the control unit 10 continuously watches for an input of an offset/gain adjustment instruction which is generated when an operator requests the offset/gain adjustment operation or when such is sent from a host apparatus (not shown) connected to the image reading apparatus 300.

When the control unit 10 detects the offset/gain adjustment instruction and Step S301 results in YES, the process proceeds to Step S302 in which the control unit 10 instructs a sub-scanning mechanism (not shown) to move the image sensor 2 to a first reference white reading position X at which the CCD 2a can read the reference white line image of the reference white/black plate 1a. Then, in Step S303, the control unit 10 instructs the light source 1b for irradiating the reference white/black plate 1a to turn on when the light is off and to remain on when the light is on.

In Step S304, the control unit 10 temporarily selects and sends one of the offset-level-change signals to the offset adjusting circuit 4 so as to set the offset c/b signal to the "offset 0" level, or 0 mV. Accordingly, the image signal A, as it is, becomes the image signal B and is input to the A/D converter 5. In Step S305, the control unit 10 instructs the sample clock generator 6 to set the sample clock signal to the phase P(2), at which stable and average white and black outputs can be sampled.

Then, the control unit 10 instructs the image sensor 2 to read the reference white line image at the first reference white reading position X in the main scanning direction, in Step S306. At this time, the image signal A from the image sensor 2 is the white output and, accordingly, the image signal C is the white output. The peak value detector 7, also in Step S306, detects the peak white value $W_{PX}$ from this white output and stores the detected peak white value $W_{PX}$ in the first peak white value memory block 9a of the RAM 9. Then, in Step S307, the control unit 10 reads the peak white value $W_{PX}$ from the RAM 9.

The control unit 10 then determines, in Step S308, if the peak white value $W_{PX}$ is smaller than or equal to the reference white value $W_R$. The reference white value $W_R$ is such a value (i.e., 120) that no normal white output may have when the image sensor 2 performs the image reading operation when the reference white/black plate 1a and the interior and the exterior of the image sensor 2 are clean.

If the peak white value $W_{PX}$ is not smaller than or equal to the reference white value $W_R$ and Step S308 results in NO, the process proceeds to Step S309. In this case, the control unit 10 determines that the reference white/black plate 1a and the interior and the exterior of the image sensor 2 carry no foreign particle such as dust or the like on the specific positions relative to the image reading operation.

In Step S309, the control unit 10 instructs the image sensor 2 to move to a reading position for the reference black line image of the reference white/black plate 1a and, in Step S310, to read the reference black line image in the main scanning direction. At this time, the image signal A from the image sensor 2 is the black output and, accordingly, the image signal C is the black output. The peak value detector 7, also in Step S310, detects the peak black value $B_{PX}$ from this black output and stores the detected peak black value $B_{PX}$ in the first peak black value memory block 9b of the RAM 9. Then, in Step S311, the control unit 10 reads the peak black value $B_{PX}$ from the RAM 9.

Then, the control unit 10 controls the light source 1b to turn off in Step S312 and instructs the image sensor 2 to read the reference black line image in the main scanning direction in Step S313. At this time, the image signal A from the image sensor 2 is the dark output and, accordingly, the image signal C is the dark output. The peak value detector 7, also in Step S313, detects the peak black value $B_{PY}$ from this dark output and stores the detected peak black value $B_{PY}$ in the second peak black value memory block 9f of the RAM 9. Then, in Step S314, the control unit 10 reads the peak black value $B_{PY}$ from the RAM 9.

The control unit 10 then determines, in Step S315, if the difference between the peak black values $B_{PX}$ and $B_{PY}$ is greater than or equal to the reference black value $B_R$. The reference black value $B_R$ is such a value that the control unit 10 can determine that a foreign particle such as dust or the like is located on the reference black line image of the reference white/black plate 1a when the difference between the peak black values $B_{PX}$ and $B_{PY}$ is greater than or equal to the reference black value $B_R$. This determination uses a phenomenon that the reference black line image which has a dust particle or the like will indicate a great difference in blackness reading values in the cases when the reference black line image is irradiated with the light source on and off.

Figure 12C:
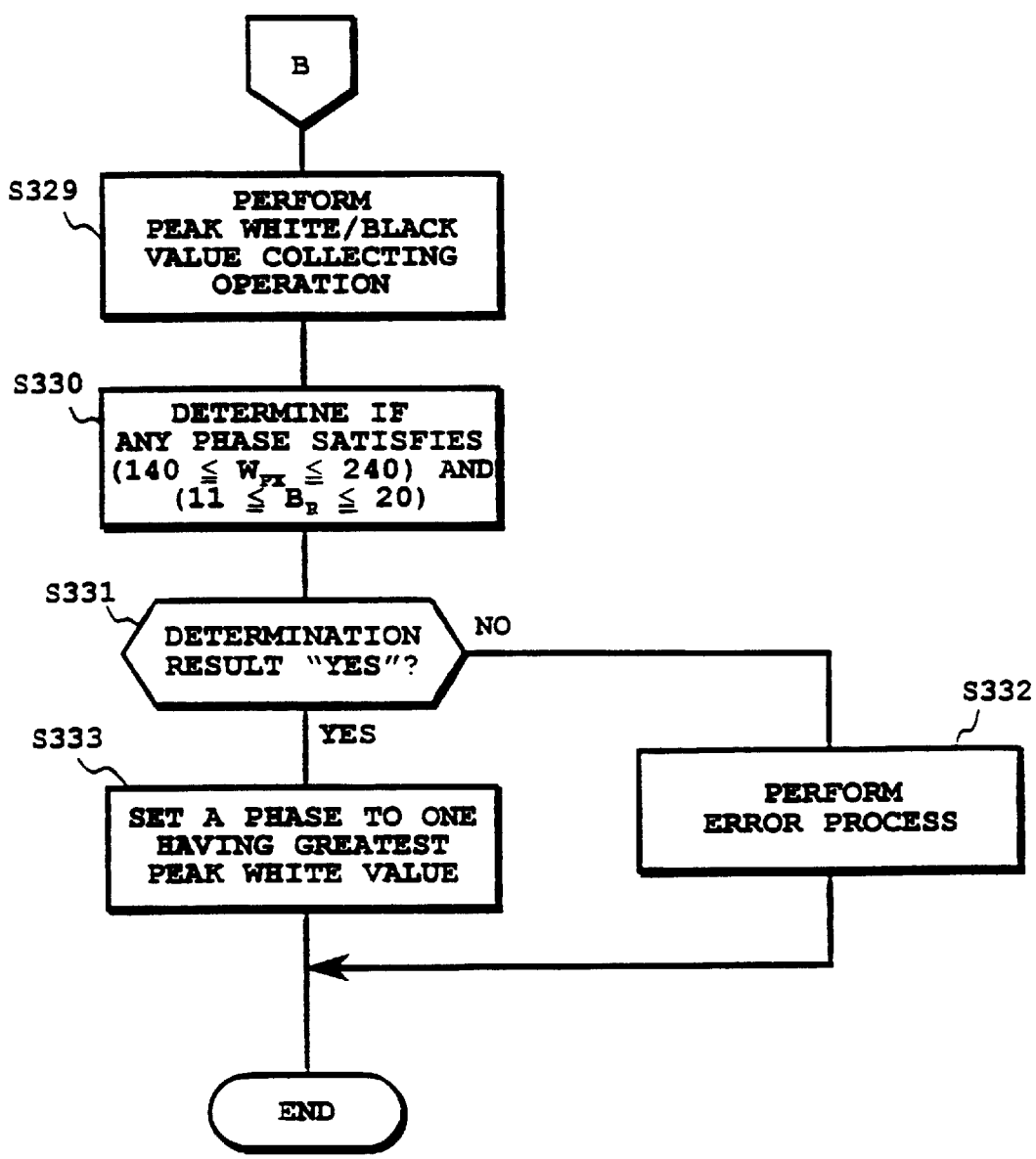

If the peak the difference between the peak black values $B_{PX}$ and $B_{PY}$ is greater than or equal to the reference black value $B_R$ and Step S315 results in YES, the process proceeds to Step S316. In this case, the control unit 10 determines that a foreign particle such as dust or the like is located on the reference black line image of the reference white/black plate 1a. In Step S316, the control unit 10 performs an error process for an excessively-great peak black output. During the error process for the excessively-great peak output in Step S316, the control unit 10 instructs the error displaying unit 12 to display an error indicating an excessively-great peak black output. With this indication, the user will be notified of an action for cleaning off the reference black line image of the reference white/black plate 1a. Accordingly, when the operation is repeated from Step S301 after the cleaning, the Step S108 results in NO and the process proceeds to the main portion of the offset/gain adjustment operation illustrated in Steps S318–S328 of FIG. 12B and Steps S329–S333 of FIG. 12C, using reference black value $B_R$ similar to the manner in which the reference peak black value $B_P$ is used in Steps S113–123 of FIG. 6B and Steps S124–S128 of FIG. 6C. Descriptions for these operation steps is omitted since they are similar to those of the image reading apparatus 100 explained in Steps S113–123 of FIG. 6B and Steps S124–S128 of FIG. 6C. Also, the peak white/black value collecting operation which is performed in Step S329 of FIG. 12C is similar to that of Step S124 of FIG. 6C.

In Step S308 of FIG. 12A, if the peak white value $W_{PX}$ is smaller than or equal to the reference white value $W_R$ and the determination results in YES, the process proceeds to Step S334 of FIG. 12D. In this case, the control unit 10 determines that the reference white/black plate 1a or the interior or the exterior of the image sensor 2 carries a foreign particle such as dust or the like. Accordingly, the control unit 10 performs an error process for identifying whether an error is caused by a foreign particle such as dust or the like which is put on one of the reference white/black image plate 1a and the exterior of the image sensor 2, or on the interior of the image sensor 2. This error identification process is performed in Steps S334–S339, which are similar to the process explained in Steps S228–S233. Therefore, a description for the identification process is omitted to be repeated. However, after Steps S338 or S339 in the process of FIG. 12D, the control unit 10 does not end but returns the process back to Step S309. This is so in order for the user to automatically retry to check the peak black value after taking an appropriate action in accordance with the indication on the error displaying unit 12 in Steps S338 or S339.

In this way, the image reading apparatus 300 performs the offset/gain adjusting operation, and can detect a foreign particle such as dust or the like which disturb the image reading operation when such foreign particle is put on a specific position relative to the image reading operation, such as one of the reference white and reference black line images of the reference white/black plate 1a and the exterior of the image sensor 2, or the interior of the image sensor 2, or the like.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This application is based on Japanese patent application No. JPAP09339517 filed in the Japanese Patent Office on Nov. 26, 1997, and the entire contents thereof are hereby incorporated by reference.

What is claimed as new and is desired to be secured by Letters Patent of the United States is:

1. An image reading apparatus, comprising:
   a reference image plate having a reference white image on a surface thereof;
   an image reading device configured to read first and second lines of said reference white image at first and second positions in a main scanning direction respectively;
   a peak value detector configured to detect a first smallest data among data included in said first line, and to detect a second smallest data among data included in said second line read by said image reading device;
   a first memory configured to store a first reference value and a second memory configured to store a second reference value;
   a comparator configured to compare each of said first and second smallest data with said first reference value and to compare a difference between said first and second smallest data to said second reference value; and
   an error output controller configured to output a white image error based on a result of said comparison made by said comparator.

2. The image reading apparatus of claim 1,
   wherein said error output controller is configured to output a white image error as caused by an exterior error factor when at least one of said first and second smallest data is smaller than or equal to said first reference value and when said first difference is greater than said second reference value, and wherein said error output controller is configured to output a white image error as caused by an interior error factor when at least one of said first and second smallest data is smaller than or equal to said first reference value and when said first difference is smaller than or equal to said second reference value.

3. The image reading apparatus of claim 1, further comprising a third memory that stores a third reference value;
   wherein said reference image plate includes a reference black image on the surface thereof;
   wherein said image reading device is configured to read said reference black image for at least one line in the main scanning direction in a first condition in which a light source illuminates said reference image plate and in a second condition in which no light source illuminates said reference image plate;
   wherein said peak value is configured to detect a first greatest data among data included in said reference black image, read in said first condition and a second greatest data read in said second condition;
   wherein said comparator comprises a calculator configured to compare said first greatest data with said second greatest data, said calculator configured to calculate a second difference between said first and second greatest data, and said calculator configured to compare said second difference with said third reference value; and
   wherein said error output controller is configured to output a black image error when said second difference is greater than said third reference value.

4. The image reading apparatus of claim 1, wherein said first memory includes a plurality of first reference values which are user selectable.

5. The image reading apparatus of claim 1, wherein said image reading device includes a charge-coupled device.

6. An image reading apparatus, comprising:
   reference image plate means having a reference white image on a surface thereof;
   image reading means for reading first and second lines of said reference white image at first and second positions in a main scanning direction respectively;
   peak value detecting means for detecting a first smallest data among data included in said first line, and for detecting a second smallest data among data included in said second line read by said image reading means;
   first memory means for storing a first reference value and a second memory means for storing a second reference value;
   comparing means for comparing each of said first and second smallest data with said first reference value and for comparing a difference between said first and second smallest data to said second reference value; and
   error output controlling means for outputting a white image error based on a result of said comparison made by said comparing means.

7. The image reading apparatus of claim 6,
   wherein said error output controlling means includes means for outputting a white image error as caused by an exterior error factor when at least one of said first and second smallest data is smaller than or equal to said first reference value and when said first difference is greater than said second reference value, means for and outputting a white image error as caused by an interior error factor when at least one of said first and second smallest data is smaller than or equal to said first reference value and when said first difference smaller than or equal to said second reference value.

8. The image reading apparatus of claim 6, further comprising third memory means for storing a third reference value;
   wherein said reference image plate means includes a reference black image on the surface thereof;
   wherein said image reading means includes means for reading said reference black image for at least one line in the main scanning direction in a first condition in which a light source illuminates said reference image plate means and in a second condition in which no light source illuminates said reference image plate means;

wherein said peak value detecting means includes means for detecting a first greatest data among data included in said reference black image read in said first condition and means for detecting a second greatest data among data read in said second position;

wherein said calculating means includes means for comparing said first greatest data with said second greatest data, means for calculating a second difference between said first and second greatest data, and means for comparing said second difference with said third reference value; and wherein said error output controlling means includes means for outputting a black image error when said second difference is greater than said third reference value.

9. The image reading apparatus of claim 6, wherein said first memory includes a plurality of first reference values which are user selectable.

10. The image reading apparatus of claim 6, wherein said image reading device comprises a charge-coupled device.

11. A method for detecting a foreign particle in an image reading apparatus, said method comprising:

storing first and second reference values;

reading first and second lines of a reference white image at first and second positions;

detecting a first smallest data among data included in said first line and a second smallest data among data included in said second line read by said image reading step;

comparing each of said first and second smallest data with said first reference value, and the difference between said first and second smallest data to said second reference value; and outputting a white image error based on a result of said comparison.

12. The method of claim 11, further comprising the steps of:

outputting a white image error as caused by an exterior error factor when at least one of said first and second smallest data is smaller than or equal to said first reference value and when said first difference is greater than said second reference value; and outputting a white image error as caused by an interior error factor when at least one of said first and second smallest data is smaller than or equal to said first reference value and when said first difference is smaller than or equal to said second reference value.

13. The method of claim 12, further comprising the steps of:

storing a third reference value;

reading a reference black image for at least one line in the main scanning direction in a first condition in which a light source illuminates said reference black image and in a second condition in which no light source illuminates said reference black image;

detecting a first greatest data among data included in said reference black image read in said first condition during said reference black reading step;

detecting a second greatest data included in said reference black image read in said second condition during said reading said reference black image step;

comparing said first greatest data with said second greatest data with said second greatest data;

calculating a second difference between said first and second greatest data;

comparing said second difference with said third reference value; and outputting a black image error when said second difference is greater than said third reference value.

14. The method of claim 11, wherein said storing step includes a plurality of first reference values which are users selectable.

15. The method of claim 11, wherein said reading step is performed with a charge-coupled device.

* * * * *